United States Patent
Yasui et al.

[19]

[11] Patent Number: 6,116,213

[45] Date of Patent: Sep. 12, 2000

[54] CONTROL SYSTEM FOR CONTROLLING INTERNAL COMBUSTION ENGINE

[75] Inventors: Yuji Yasui; Shusuke Akazaki; Yoshihisa Iwaki; Tadashi Satoh; Masaki Ueno, all of Wako, Japan

[73] Assignee: Honda Giken Kogyo Kabushiki Kaisha, Tokyo, Japan

[21] Appl. No.: 09/063,732

[22] Filed: Apr. 24, 1998

[30] Foreign Application Priority Data

Apr. 25, 1997 [JP] Japan ...................................... 9-109197
Jan. 22, 1998 [JP] Japan .................................. 10-010326

[51] Int. Cl.[7] .................................................... F02D 43/00
[52] U.S. Cl. ........................................ 123/339.11; 60/284
[58] Field of Search .......................... 123/339.11; 60/284

[56] References Cited

U.S. PATENT DOCUMENTS 5,492,094  2/1996  Cullen et al. ....................... 123/339.11
5,950,419  9/1999  Nishimura et al. ........................ 60/284

FOREIGN PATENT DOCUMENTS 6-101456  4/1994  Japan .

*Primary Examiner*—Andrew M. Dolinar
*Attorney, Agent, or Firm*—Arent Fox Kintner Plotkin & Kahn, PLLC

[57] ABSTRACT

A control system for controlling an internal combustion engine which discharge exhaust gases through an emission purifier includes a controller which increases the quantity of intake air drawn into the internal combustion engine while the internal combustion engine is idling after the internal combustion engine has started to operate, to a level which is greater by a predetermined increase than the quantity of intake air drawn into the internal combustion engine while the internal combustion engine is idling normally. The controller also generates a command value for ignition timing of the internal combustion engine according to a feedback control process to converge the rotational speed of the internal combustion engine toward a predetermined target rotational speed, and controlling the ignition timing of the internal combustion engine based on the generated command value thereby to retard the ignition timing. The controller establishes the target rotational speed by changing the target rotational speed from a preset rotational speed toward a predetermined idling speed after the rotational speed of the internal combustion engine has reached the preset rotational speed which is higher than the idling speed after the quantity of intake air drawn into the internal combustion engine has started being increased.

19 Claims, 14 Drawing Sheets

MAIN ROUTINE

PROCESS OF DECIDING CONDITIONS (STEP3-4)

PROCESS OF CALCULATING THO (STEP3-5)

PROCESS OF CALCULATING THO/CWU (STEP5-1)

PROCESS OF CALCULATING IGNITION TIMING (STEP3-6)

PROCESS OF CALCULATING RETARD CORRECTIVE QUANTITY (STEP10-3)

CONTROL SYSTEM FOR CONTROLLING INTERNAL COMBUSTION ENGINE

BACKGROUND OF THE INVENTION

1. Field of the Invention

The present invention relates to a control system for controlling an internal combustion engine which discharge exhaust gases through an emission purifier.

2. Description of the Prior Art

Internal combustion engines equipped with a three-way catalytic converter generally fail to provide a desired level of emission purifying performance unless the catalytic converter is activated with its temperature raised to a certain level. Therefore, it has heretofore been an important task to achieve a desired level of emission purifying performance immediately after the internal combustion engine has started its operation when the temperature of the catalytic converter is relatively low.

One known attempt to carry out such a task is disclosed in Japanese laid-open patent publication No. 6-101456, for example.

According to the disclosed arrangement, the ignition timing of an internal combustion engine is retarded with respect to normal timing for thereby increasing the temperature of exhaust gases, so that the temperature of a catalytic converter combined with the internal combustion engine will quickly be increased for enabling the catalytic converter to provide a desired level of emission purifying performance at an early stage. Furthermore, it is also disclosed to increase the quantity of intake air drawn into the internal combustion engine for preventing the torque and rotational speed thereof from being lowered due to the retarded ignition timing.

Specifically, a corrective quantity for retarding the ignition timing while the internal combustion engine is idling is determined, using a data table or the like, from operating conditions including a coolant temperature at the time of starting the internal combustion engine, and the quantity of intake air to be increased is determined depending on the determined corrective quantity. The ignition timing and the quantity of intake air are controlled in a feedforward fashion according to the determined values therefor.

According to the disclosed arrangement, however, the process of determining the corrective quantity for retarding the ignition timing depending on various coolant temperatures and the control timing for controlling the ignition timing, and the process of determining the quantity of intake air depending on the correction of the ignition timing and the control timing for controlling the quantity of intake air have to be preset in a closely correlated manner. Therefore, a control system for carrying out the above control processes is complex, and settings for enabling the control system to achieve a desired level of emission purifying performance tend to become inappropriate. As a result, it is difficult to stably control the ignition timing and the quantity of intake air for activating the emission purifier at an early stage for a desired level of emission purifying performance, without changing the torque and rotational speed of the internal combustion engine.

Since the quantity of intake air is determined depending on the corrective quantity for ignition timing according to the invention disclosed in the above publication, a delay in controlling the quantity of intake air with respect to controlling the ignition timing has to be taken into account for the overall control process, resulting in control system complexities and setting difficulties.

Internal combustion engines generally are subject to less friction in various parts and higher rotational speed as they are warmed up. The manner in which the various parts suffer less friction is affected by various elements including the nature of a fuel used, the type, amount, and temperature of a lubricant used, and the temperature of a coolant used. For this reason, there are instances where the friction of various parts drops faster than normal and instances where friction of various parts drops earlier than normal.

According to the disclosed arrangement of the above publication, as described above, a corrective quantity for retarding the ignition timing while the internal combustion engine is idling is determined, using a data table or the like, from operating conditions including a coolant temperature at the time of starting the internal combustion engine, and the quantity of intake air to be increased is uniformly determined depending on the determined corrective quantity. Therefore, it is difficult to adequately suppress variations in the rotational speed due to the reduction in the friction of various parts of the internal combustion engine owing to various elements as referred to above.

SUMMARY OF THE INVENTION

It is therefore an object of the present invention to provide a control system for controlling an internal combustion engine according to a relatively simple process to control the ignition timing and the quantity of intake air of the internal combustion engine for activating an emission purifier at an early stage to achieve a desired level of emission purifying performance after the internal combustion engine has started to operate, so that the internal combustion engine is capable of discharging purified exhaust gases.

Another object of the present invention is to provide a control system for controlling an internal combustion engine to operate stably smoothly and adequately suppress variations in the rotational speed of the internal combustion engine due to a reduction in the friction of various parts of the internal combustion engine for thereby keeping the rotational speed at a stable level.

To achieve the above objects, there is provided in accordance with the present invention a control system for controlling an internal combustion engine which discharge exhaust gases through an emission purifier, comprising intake air quantity control means for increasing the quantity of intake air drawn into the internal combustion engine while the internal combustion engine is idling after the internal combustion engine has started to operate, to a level which is greater by a predetermined increase than the quantity of intake air drawn into the internal combustion engine while the internal combustion engine is idling normally, and ignition timing control means for generating a command value for ignition timing of the internal combustion engine according to a feedback control process to converge the rotational speed of the internal combustion engine toward a predetermined target rotational speed, and controlling the ignition timing of the internal combustion engine based on the generated command value thereby to retard the ignition timing.

After the internal combustion engine has started to operate, the intake air quantity control means increases the quantity of intake air drawn into the internal combustion engine to a level which is greater by a predetermined increase than the quantity of intake air drawn into the internal combustion engine while the internal combustion engine is idling normally, e.g., after a motor vehicle incorporating the control system has run normally, but not while the internal combustion engine is idling for quickly activating a catalytic converter after the internal combustion engine has started to operate. At this time, the rotational speed of the internal combustion engine tends to increase because the quantity of intake air drawn into the internal combustion engine increases. However, the ignition timing control means generates a command value for ignition timing of the internal combustion engine according to a feedback control process to converge the rotational speed of the internal combustion engine toward a predetermined target rotational speed, and controls the ignition timing of the internal combustion engine based on the generated command value. Specifically, the ignition timing control means controls the ignition timing in order to hold the rotational speed, which tends to increase due to the increased quantity of intake air, to the target rotational speed according to the feedback control process. As a result, the ignition timing of the internal combustion engine is retarded to reduce the tendency of the rotational speed to increase due to the increased quantity of intake air. Thus, the internal combustion engine generates more heat of combustion than when it idles normally, increasing the temperature of exhaust gases discharged therefrom. The catalytic converter warmed by the exhaust gases is activated quickly for achieving a desired level of emission purifying performance.

Since the ignition timing is controlled by the ignition timing control means while the quantity of intake air is being increased by the intake air quantity control means, it is not necessary to take into account a delay in the control of the quantity of intake air. Specifically, because a delay in the control of the quantity of intake air is reflected in the rotational speed (actual rotational speed) of the internal combustion engine, the ignition timing is controlled according to the feedback control process to converge the rotational speed toward the target rotational speed, and the ignition timing thus controlled is optimized for the actual quantity of intake air.

Inasmuch as the increased quantity of intake air and the retarded ignition timing are appropriately correlated due to the feedback control of the ignition timing, the control action of the intake air quantity control means and the control action of the ignition timing control means can be effected independently of each other. Particularly, the controlling of the ignition timing is performed only according to the feedback control process which is focused only on the rotational speed of the internal combustion engine. Therefore, the controlling of the quantity of intake air and the controlling of the ignition timing can be carried out according to a simple control procedure.

Consequently, the ignition timing of the internal combustion engine and the quantity of intake air drawn into the internal combustion engine can accurately be controlled according to a simple control procedure for quickly activating the catalytic converter or emission purifier for a desired level of emission purifying performance after the internal combustion engine has started to operate, so that the internal combustion engine is capable of discharging purified exhaust gases. Basically, the rotational speed and torque of the internal combustion engine are also stabilized because the ignition timing of the internal combustion engine is controlled according to the feedback control process to converge the rotational speed toward the target rotational speed while the quantity of intake air is being increased.

The target rotational speed may be constant from the start of the controlling of the ignition timing with the ignition timing control means. Preferably, however, the control system further comprises target rotational speed setting means for establishing the target rotational speed by changing the target rotational speed from a preset rotational speed toward a predetermined idling speed after the rotational speed of the internal combustion engine has reached the preset rotational speed which is higher than the idling speed after the quantity of intake air drawn into the internal combustion engine has started being increased by the intake air quantity control means.

The target rotational speed used for controlling the ignition timing according to the feedback control process is established by changing itself from a preset rotational speed toward a predetermined idling speed after the rotational speed of the internal combustion engine has reached the preset rotational speed which is higher than the idling speed, at which the rotational speed will finally be kept. The target rotational speed will finally be set to the idling speed. The ignition timing is controlled according to the feedback control process to converge the rotational speed progressively toward the target rotational speed. Specifically, the ignition timing is controlled (retarded) in order to keep the rotational speed, after having increased to the preset rotational speed higher than the idling speed due to the increased quantity of intake air, higher than the idling speed, which is the final target rotational speed, for a certain period of time, and the finally converge the rotational speed toward the idling speed. In this manner, the rotational speed is prevented from abruptly dropping or dropping largely with respect to the idling speed, thus preventing the internal combustion engine from operation unstably, during an initial stage of the controlling (retarding) of the ignition timing according to the feedback control process.

The intake air quantity control means preferably comprises means for establishing said predetermined increase depending on the engine temperature of the internal combustion engine.

When the engine temperature is relatively high, if the heat of combustion produced by the internal combustion engine is too intensive due to the increased quantity of intake air and the controlled ignition timing, then the internal combustion engine suffers a burden. When the engine temperature is relatively high, the temperature of the catalytic converter is often relatively high. Because the increase in the quantity of intake air depends on the engine temperature, the internal combustion engine is prevented from suffering an undue burden or from producing too intensive heat of combustion. Since the ignition timing is retarded depending on the increase in the quantity of intake air which is established depending on the engine temperature, the ignition timing depends on the engine temperature.

The intake air quantity control means preferably comprises means for increasing said predetermined increase progressively with time immediately after the quantity of intake air drawn into the internal combustion engine has started being increased. If the quantity of intake air were increased stepwise immediately after the internal combustion engine has started to operate, then the internal combustion engine would be liable to operate unstably. However, since the increase in the quantity of intake air is progressively increased, the internal combustion engine is prevented from operating unstably.

Furthermore, the intake air quantity control means preferably comprises means for reducing the predetermined increase progressively with time upon elapse of a predetermined time after the quantity of intake air drawn into the internal combustion engine has started being increased. Upon elapse of a predetermined time after the internal combustion engine has started to operate, even if the quantity of intake air is constant, friction in various parts of the internal combustion engine is reduced as the internal combustion engine is warmed up, and the rotational speed of the internal combustion engine tends to increase. By progressively reducing the increase in the quantity of intake air after elapse of the predetermined time, the tendency of the rotational speed to increase due to the reduced friction can be compensated for without unduly retarding the ignition timing.

The features described above represent a basic concept of the present invention.

Ignition timing that can be controlled actually for an internal combustion engine, i.e., ignition timing capable of operating an internal combustion engine properly, has a certain allowable range due to mechanical or electrical properties of an ignition device such as a distributor or the like and operating characteristics of the internal combustion engine. Inasmuch as the command value for ignition timing that is generated by the ignition timing control means is generated simply to converge the rotational speed of the internal combustion engine toward the target rotational speed, the command value itself may fall out of the allowable range. If the command value falls out of the allowable range, then the actual ignition timing of the internal combustion engine has to be limited to a limit value of the allowable range.

As the internal combustion engine is warmed up, friction of various parts of the internal combustion engine is reduced, allowing the rotational speed of the internal combustion engine to increase. As a consequence, the command value for ignition timing generated according to the feedback control process is liable to be retarded closely to a retarded limit of the allowable range.

As described above, after elapse of a certain time after the quantity of intake air drawn into the internal combustion engine has started to be increased, the increase in the quantity of intake air is progressively reduced to reduce the tendency of the rotational speed to increase due to the lowered friction, preventing the command value for ignition timing from reaching the retarded limit of the allowable range. However, the friction of various parts of the internal combustion engine is affected by various factors, and may drop to an unexpectedly large degree or at an early stage. In such a case, even when the increase in the quantity of intake air is progressively reduced solely with time, the tendency of the actual rotational speed to increase with respect to the target rotational speed cannot sufficiently be reduced, allowing the generated command value for ignition timing to reach the retarded limit of the allowable range or even to be retarded in excess of the retarded limit of the allowable range. If the command value for ignition timing reaches the retarded limit of the allowable range or is retarded in excess of the retarded limit of the allowable range, then since the actual ignition timing of the internal combustion engine has to be limited to the retarded limit of the allowable range, the actual ignition timing (the retarded limit of the allowable range) is more advanced than the command value for ignition timing that is generated to converge the rotational speed toward the target rotational speed. As a result, the tendency of the rotational speed to rise up to a level higher than the target rotational speed cannot be reduced.

In view of the above drawback, the intake air quantity control means preferably comprises means for correcting the predetermined increase so as to reduce the quantity of intake air when the command value for ignition timing generated by the ignition timing control means according to the feedback control process becomes more retarded than a predetermined threshold, which is established in a retarded range, within an allowable range of ignition timing in which the internal combustion engine can operate normally.

While the rotational speed of the internal combustion engine tends to become higher than the target rotational speed due to the lowered friction of various parts of the internal combustion engine, if the command value for ignition timing generated according to the feedback control process is continuously retarded, then the command value becomes more retarded than the threshold. When this happens, the intake air quantity control means corrects the predetermined increase so as to reduce the quantity of intake air. The tendency of the rotational speed to increase is now reduced, preventing the command value for ignition timing from being further retarded. Since the threshold is within the allowable range of ignition timing, the command value for ignition timing easily falls in the allowable range. Stated otherwise, if the command value for ignition timing is apt to be retarded out of the allowable range due to the rotational speed tending to increase, then the increase in the quantity of intake air is reduced to suppress the tendency of the rotational speed to increase. The command value for ignition timing is now preventing from being continuously retarded out of the allowable range. Consequently, while the rotational speed of the internal combustion engine tends to become higher than the target rotational speed due to the lowered friction of various parts of the internal combustion engine, a command value for ignition timing which would be retarded out of the allowable range is prevented from being generated, and the ignition timing of the internal combustion engine can be controlled according to a command value that is generated to converge the rotational speed toward the target rotational speed. The rotational speed can now be converged stably toward the target rotational speed, and hence can be controlled stably at the target rotational speed.

When the command value for ignition timing is more retarded than the threshold, the correction of the increase in the quantity of intake air to reduce the quantity of intake air is not necessarily combined with the progressive reduction of the increase in the quantity of intake air with time. However, these control processes may be combined with each other for accurately reducing the tendency of the rotational speed to increase due to the lowered friction of the internal combustion engine for thereby stabilizing the rotational speed of the internal combustion engine.

Preferably, the intake air quantity control means comprises means for progressively increasing a corrective quantity by which the predetermined increase is corrected so as to reduce the quantity of intake air, when the command value for ignition timing generated by the ignition timing control means according to the feedback control process is more retarded than the predetermined threshold.

By progressively increasing the corrective quantity by which the predetermined increase is corrected so as to reduce the quantity of intake air when the command value for ignition timing is more retarded than the predetermined threshold, even when the rotational speed strongly tends to increase due to a relatively large drop in the friction of the internal combustion engine, it is possible to prevent the generated command value for ignition timing from being retarded out of the allowable range. At the same time, the rotational speed and ignition timing of the internal combustion engine are prevented from changing abruptly, permitting the internal combustion engine to operate or combust the fuel stably.

Preferably, the intake air quantity control means comprises means for increasing the corrective quantity in each control cycle by a predetermined value established depending on a warmed-up state of the internal combustion engine, when the corrective quantity by which the predetermined increase is corrected so as to reduce the quantity of intake air is progressively increased.

The time-dependent reduction in the friction of the internal combustion engine basically depends on the warmed-up state of the internal combustion engine (e.g., the engine temperature at the time the internal combustion engine is started). Therefore, when the corrective quantity by which the predetermined increase is corrected so as to reduce the quantity of intake air is progressively increased in each control cycle by a predetermined value established depending on the warmed-up state of the internal combustion engine, the increase in the quantity of intake air can be reduced in a manner to match the time-dependent reduction in the friction of the internal combustion engine. Accordingly, the tendency of the rotational speed to increase due to the lowered friction of the internal combustion engine, allowing the command value for ignition timing to be retarded out of the allowable range, can appropriately be reduced.

The intake air quantity control means preferably comprises means for holding the corrective quantity by which the predetermined increase is corrected so as to reduce the quantity of intake air, to a present corrective quantity when the command value for ignition timing generated by the ignition timing control means according to the feedback control process is changed so as to be more advanced than the predetermined threshold, when the predetermined increase is corrected so as to reduce the quantity of intake air. The fact that the command value for ignition timing is more advanced than the threshold during the reduction of the increase in the quantity of intake air means that the tendency of the rotational speed to increase is reduced without further reducing the increase in the quantity of intake air. Therefore, by holding the corrective quantity for the increase to the present corrective quantity, it is possible to prevent the increase in the quantity of intake air from being excessively reduced and hence to prevent the quantity of heat generated by the internal combustion engine from being excessively reduced. Therefore, the catalytic converter can be activated early.

As described above, the increase in the quantity of intake air is reduced when the command value for ignition timing is retarded out of the allowable range. Though the threshold may be set to the retarded limit of the allowable range, the threshold is preferably more advanced than a retarded limit of the allowable range of ignition timing. With the threshold being more advanced than the retarded limit of the allowable range of ignition timing, before the command value for ignition timing reaches the retarded limit due to the tendency of the rotational speed to increase, the tendency of the rotational speed to increase is reduced by reducing the increase in the quantity of intake air. Therefore, the command value for ignition timing easily falls in the allowable range reliably. Thus, the ignition timing of the internal combustion engine can be controlled reliably according to the command value for ignition timing, so that the controllability and stability of the rotational speed of the internal combustion engine can be increased.

When the command value for ignition timing, is more retarded than the threshold, the increase in the quantity of intake air is reduced. Preferably, the ignition timing control means comprises means for generating the command value for ignition timing of the internal combustion engine according to a proportional plus integral (PI) control process as the feedback control process, and controlling the ignition timing of the internal combustion engine with a retarded limit of the allowable range of ignition timing and holding the value of an integral term of the proportional plus integral control process to a present value when the generated command value becomes more retarded than the retarded limit of the allowable range of ignition timing.

If the tendency of the rotational speed cannot immediately be reduced by reducing the increase in the quantity of intake air due to an abrupt reduction in the load on the internal combustion engine, and the command value for ignition timing is more retarded than the retarded limit of the allowable range, then the rotational speed is increased by limiting the ignition timing of the internal combustion engine to the retarded limit which is more advanced than the command value for ignition timing. At this time, since the value of the integral term of the proportional plus integral control process is held to the present value, when the rotational speed subsequently tends to decrease with respect to the target rotational speed due to a further reduction in the increase in the quantity of intake air or a sharp increase in the load on the internal combustion engine, the command value for ignition timing generated by the proportional plus integral control process quickly becomes more advanced than the retarded limit. Consequently, the ignition timing of the internal combustion engine can quickly be controlled according to the command value for ignition timing, so that the tendency of the rotational speed to decreased is quickly reduced, permitting the rotational speed to converge reliably toward the target rotational speed.

The proportional plus integral control process may be replaced with a proportional plus integral plus derivative (PID) control process.

The control system according to present invention may further incorporate the following features:

The control system further comprises decision means for deciding whether or not the increasing of the quantity of intake air with the intake air quantity control means and the controlling of the ignition timing of the internal combustion engine with the ignition timing control means are to be canceled, based on an operating state of the internal combustion engine, wherein the intake air quantity control means and the ignition timing control means are disabled if the increasing of the quantity of intake air with the intake air quantity control means and the controlling of the ignition timing of the internal combustion engine with the ignition timing control means are to be canceled as decided by the decision means.

Specifically, the decision means comprises means for deciding that the increasing of the quantity of intake air with the intake air quantity control means and the controlling of the ignition timing of the internal combustion engine with the ignition timing control means are to be canceled, if at least one of a load, a rotational speed, and an engine temperature of the internal combustion engine, as the operating state, satisfies a predetermined condition.

Alternatively, the control system further comprising decision means for deciding whether or not the increasing of the quantity of intake air with the intake air quantity control means and the controlling of the ignition timing of the internal combustion engine with the ignition timing control means are to be canceled, based on an elapsed time in which the quantity of intake air is increased by the intake air quantity control means, wherein the intake air quantity control means and the ignition timing control means are disabled if the increasing of the quantity of intake air with the intake air quantity control means and the controlling of the ignition timing of the internal combustion engine with the ignition timing control means are to be canceled as decided by the decision means.

Specifically, the decision means comprises means for deciding that the increasing of the quantity of intake air with the intake air quantity control means and the controlling of the ignition timing of the internal combustion engine with the ignition timing control means are to be canceled, if the elapsed time exceeds a predetermined time.

Under a certain condition in which the internal combustion engine operates a load, or if the rotational speed of the internal combustion engine is excessively high or low, or the engine temperature is excessively high or low, the increasing of the quantity of intake air should preferably be canceled in order to allow the internal combustion engine operates the load or reduce the burden on the internal combustion engine. If the time in which to increase the quantity of intake air is too long, then the internal combustion engine and the emission purifier tend to be excessively high in temperature. Therefore, a certain limit should preferably be imposed on the time in which to increase the quantity of intake air.

The decision means decides whether the increasing of the quantity of intake air and the controlling of the ignition timing of the internal combustion engine are to be canceled, based on operating conditions such as the load state, rotational speed, and engine temperature of the internal combustion engine, and the elapsed time in which the quantity of intake air is increased by the intake air quantity control means. If increasing of the quantity of intake air and the controlling of the ignition timing of the internal combustion engine are to be canceled, then the intake air quantity control means and the ignition timing control means are disabled. Therefore, the quantity of intake air can be increased for activating the catalytic converter at an early stage under appropriate conditions.

Preferably, the intake air quantity control means comprises means for immediately stopping increasing the quantity of intake air when the increasing of the quantity of intake air is to be canceled as decided by the decision means, and the ignition timing control means comprises means for progressively advancing the ignition timing which has been retarded according to the feedback control process when the controlling of the ignition timing is to be canceled as decided by the decision means.

After the increasing of the quantity of intake air is stopped, the internal combustion engine can be operated as desired by actuating the throttle valve of the internal combustion engine, and the ignition timing is progressively advanced for preventing the internal combustion engine from suffering abrupt changes in the rotational speed.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
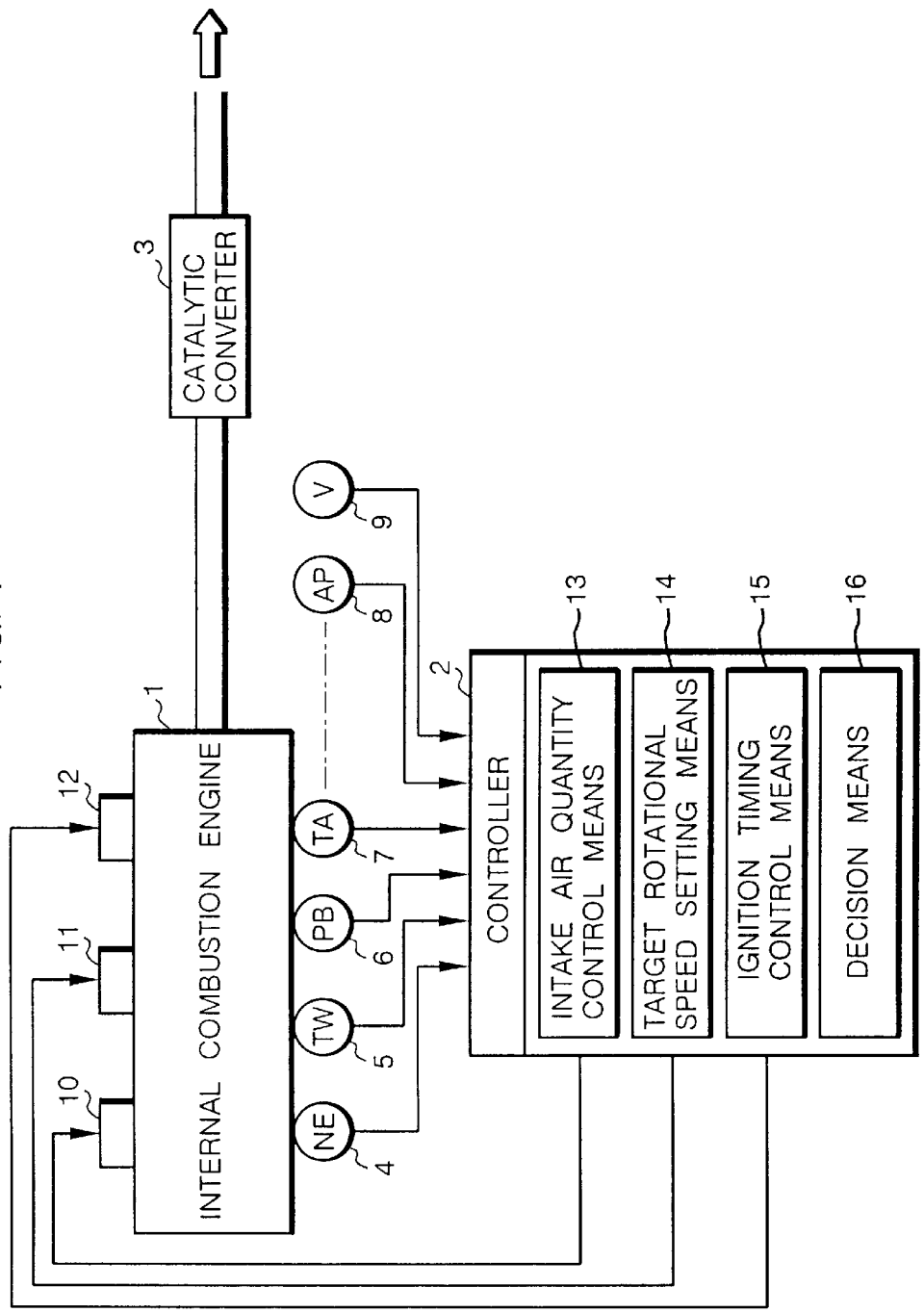
FIG. 1 is a block diagram of a control system for controlling an internal combustion engine according to the present invention.

As shown in FIG. 1, a control system for controlling an internal combustion engine 1 according to the present invention includes a controller 2 for controlling the internal combustion engine 1.

The internal combustion engine 1 is mounted as a propulsion source on a motor vehicle such as an automobile, a hybrid vehicle, etc., and discharges exhaust gases through a three-way catalytic converter 3, for example, into the atmosphere.

The control system also has a rotational speed sensor 4 for detecting a rotational speed NE of the internal combustion engine 1, an engine temperature sensor 5 for detecting an engine temperature (coolant temperature) TW of the internal combustion engine 1, a intake pressure sensor 6 for detecting an intake pressure PB of the internal combustion engine 1, an atmospheric temperature sensor 7 for detecting an atmospheric temperature TA, an accelerator pedal depression sensor 8 for detecting a movement AP of an accelerator pedal (not shown) of the motor vehicle, and a vehicle speed sensor 9 for detecting a speed V of the motor vehicle. The control system further includes an ignition device 10 for igniting an air-fuel mixture in the internal combustion engine 1, a fuel supply device 11 for supplying a fuel to the internal combustion engine 1, and a throttle valve actuator 12 for actuating throttle valves (not shown) of the internal combustion engine 1. The internal combustion engine 1 is supplied with an air-fuel mixture through passages that are equipped with the throttle valves and bypass passages that bypass the throttle valves.

The motor vehicle also includes a starter motor for starting the internal combustion engine 1, a battery for supplying electric energy to various electronic devices on the motor vehicle, a transmission (automatic transmission in the illustrated embodiment) for transmitting drive power from the internal combustion engine 1 to drive wheels, and other mechanisms, as with ordinary automobiles. The motor vehicle further includes pumps associated with a power steering system and an air conditioner, etc. and actuatable by the internal combustion engine 1.

The controller 2 comprises a microcomputer and is programmed to control the ignition device 10, the fuel supply device 11, the throttle valve actuator 12, etc. to operate the internal combustion engine 1 based on output values (detected values) from the sensors 4–9 and preset data values according to a given control program.

The controller 2 has major functions, i.e., is programmed to perform major functions, which include an intake air quantity control means 13 for controlling the throttle valve actuator 12 to increase the quantity of intake air drawn into the internal combustion engine 1 while the internal combustion engine 1 is idling after it has started to operate, a target rotational speed setting means 14 for establishing a target rotational speed for the internal combustion engine 1 when the quantity of intake air is increased, an ignition timing control means 15 for controlling, according to a feedback control process, the ignition timing of the internal combustion engine 1 by the ignition device 10 based on the target rotational speed, and a decision means 16 for deciding whether the control by the intake air quantity control means 13 and the ignition timing control means 15 is to be canceled (inhibited) or not. The detailed functions of these means 13–16 will be described later on.

Operation of the control system for controlling the internal combustion engine 1 will be described below.

Figure 2:
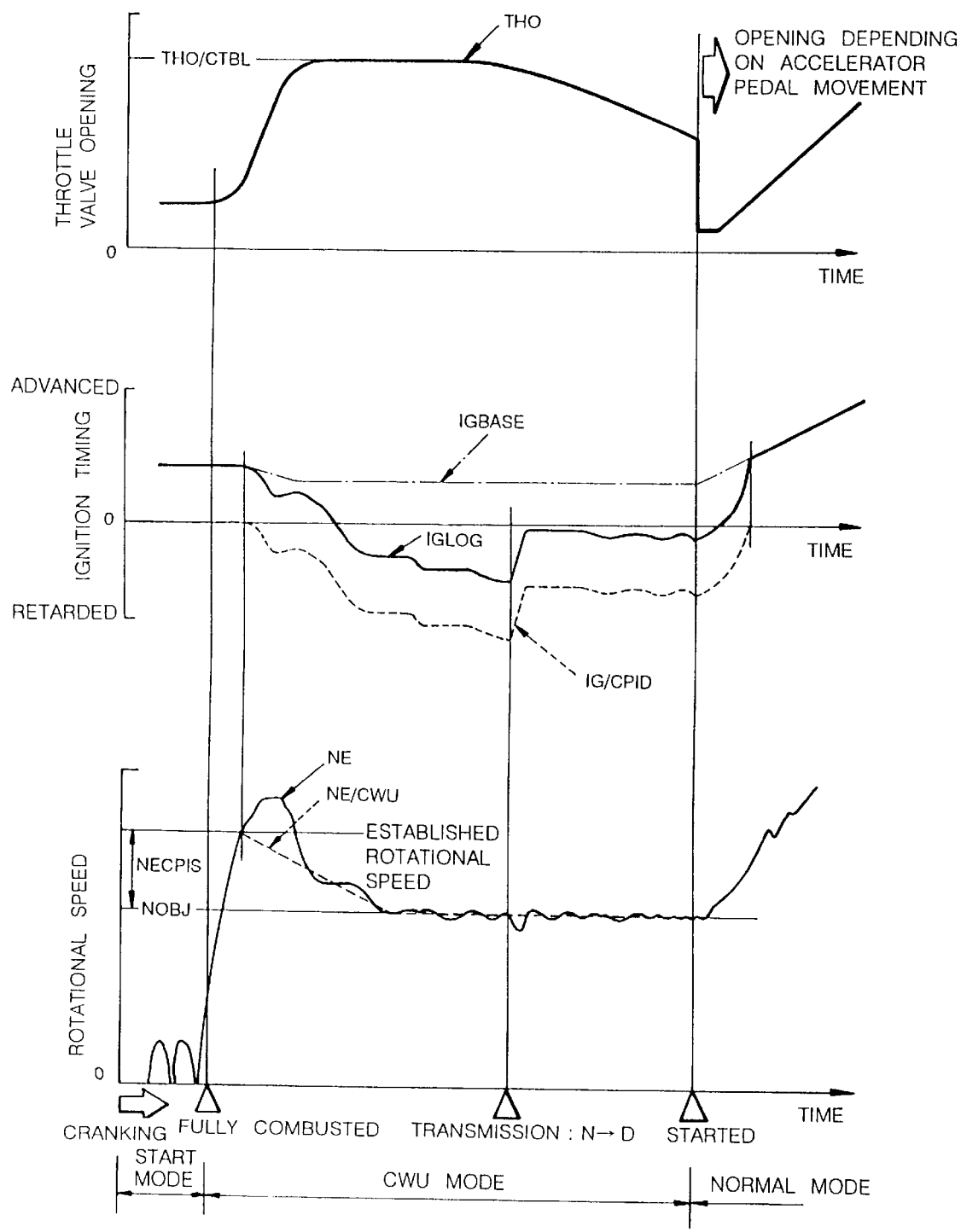
FIG. 2 is a diagram illustrative of the manner in which the control system shown in FIG. 1 operates.

First, basic operation outlines of the control system will briefly be described with reference to FIG. 2. FIG. 2 shows time-depending changes in the throttle valve opening, the ignition timing, and the rotational speed of the internal combustion engine 1 controlled by the control system, respectively in upper, middle, and lower sections of FIG. 2.

When the control system is started by a start switch (not shown) while the internal combustion engine 1 is at rest, the control system initiates an operation mode (hereinafter referred to as a "start mode") to crank the internal combustion engine 1 with the starter motor to start the internal combustion engine 1. In the start mode, the throttle valve opening and the ignition timing are controlled as shown in FIG. 2, and the rotational speed of the internal combustion engine 1 varies as shown in FIG. 2.

When a fully combusted state of the internal combustion engine 1 is confirmed in the start mode, the control system then enters an operation mode (hereinafter referred to as a "CWU" mode) to idle internal combustion engine 1 and at the same time to activate the catalytic converter 3 quickly.

In the CWU mode, the control system controls the throttle valve opening THO, which determines the quantity of intake air drawn into the internal combustion engine 1, in order to increase the quantity of intake air (THO>0) as indicated in the upper section of FIG. 2, for thereby increasing the quantity of intake air to a value greater than when the internal combustion engine 1 idles normally. When the internal combustion engine 1 idles normally such as when the motor vehicle is temporarily parked after it has run (upon idling other than the CWU mode), the throttle valve opening THO is "0", and intake air is drawn into the internal combustion engine 1 only through a bypass passage that bypasses the throttle valve. In the CWU mode, the throttle valve opening THO is controlled to increase the quantity of intake air drawn into the internal combustion engine 1 to a value greater than when the internal combustion engine 1 idles normally (the throttle valve opening THO corresponds to a throttle valve opening that is commensurate with an increase in the quantity of intake air from the quantity of intake air drawn when the internal combustion engine 1 idles normally).

The change in the throttle valve opening THO, i.e., the change in the increase in the quantity of intake air, is corrected in a manner to reduce the increase in the quantity of intake air under certain conditions.

In the CWU mode, the rotational speed NE of the internal combustion engine 1 increases as the quantity of intake air increases (the throttle valve opening THO increases), as indicated by the solid-line curve in the lower section of FIG. 2. When the rotational speed NE reaches a preset rotational speed that is higher than a predetermined idling speed NOBJ by a predetermined value NECPIS, the control system controls the ignition timing IGLOG of the internal combustion engine 1 so as to be retarded, as indicated by the solid-line curve in the middle section of FIG. 2.

For retarding the ignition timing IGLOG, there is established a target rotational speed NE/CWU for the internal combustion engine 1, as indicated by the broken-line curve in the lower section of FIG. 2. The target rotational speed NE/CWU is lowered from the preset rotational speed (NOBJ+NECPIS) at a predetermined rate (gradient) toward the idling speed NOBJ. After having reached the idling speed NOBJ, the target rotational speed NE/CWU is held to the idling speed NOBJ. The idling speed NOBJ is set to a rotational speed that is higher than the rotational speed of the internal combustion engine 1 when it idles normally.

In order to converge the rotational speed NE of the internal combustion engine 1 toward the target rotational speed NE/CWU, the control system carries out a feedback control process (PI (proportional plus integral) control process in this embodiment) for determining a corrective quantity IG/CPID for retarding the ignition timing (indicated by the broken-line curve in the middle section of FIG. 2 and hereinafter referred to as a "retarding corrective quantity IG/CPID") and correcting basic ignition timing IGBASE (indicated by the dot-and-dash-line curve in the middle section of FIG. 2) by the retarding corrective quantity IG/CPID, thus determining ignition timing IGLOG (more precisely, an ignition timing command value).

When the driver of the motor vehicle depresses the accelerator pedal to start the motor vehicle in the CWU mode, the CWU mode is canceled, and the control system enters an operation mode (hereinafter referred to as a "normal mode") to operate the internal combustion engine 1 depending on the movement of the accelerator pedal. In the normal mode, the throttle valve opening THO is controlled immediately according to the movement of the accelerator pedal (see a right-hand portion of the curve in the upper section of FIG. 2). After the CWU mode is canceled, the ignition timing IGLOG of the internal combustion engine 1 is progressively brought back to the basic ignition timing IGBASE which is more advanced than the ignition timing IGLOG.

The CWU mode may be dispensed with under certain circumstances, and may be canceled under conditions other than when the accelerator pedal is depressed.

Details of operation of the control system will be described below.

Figure 3:
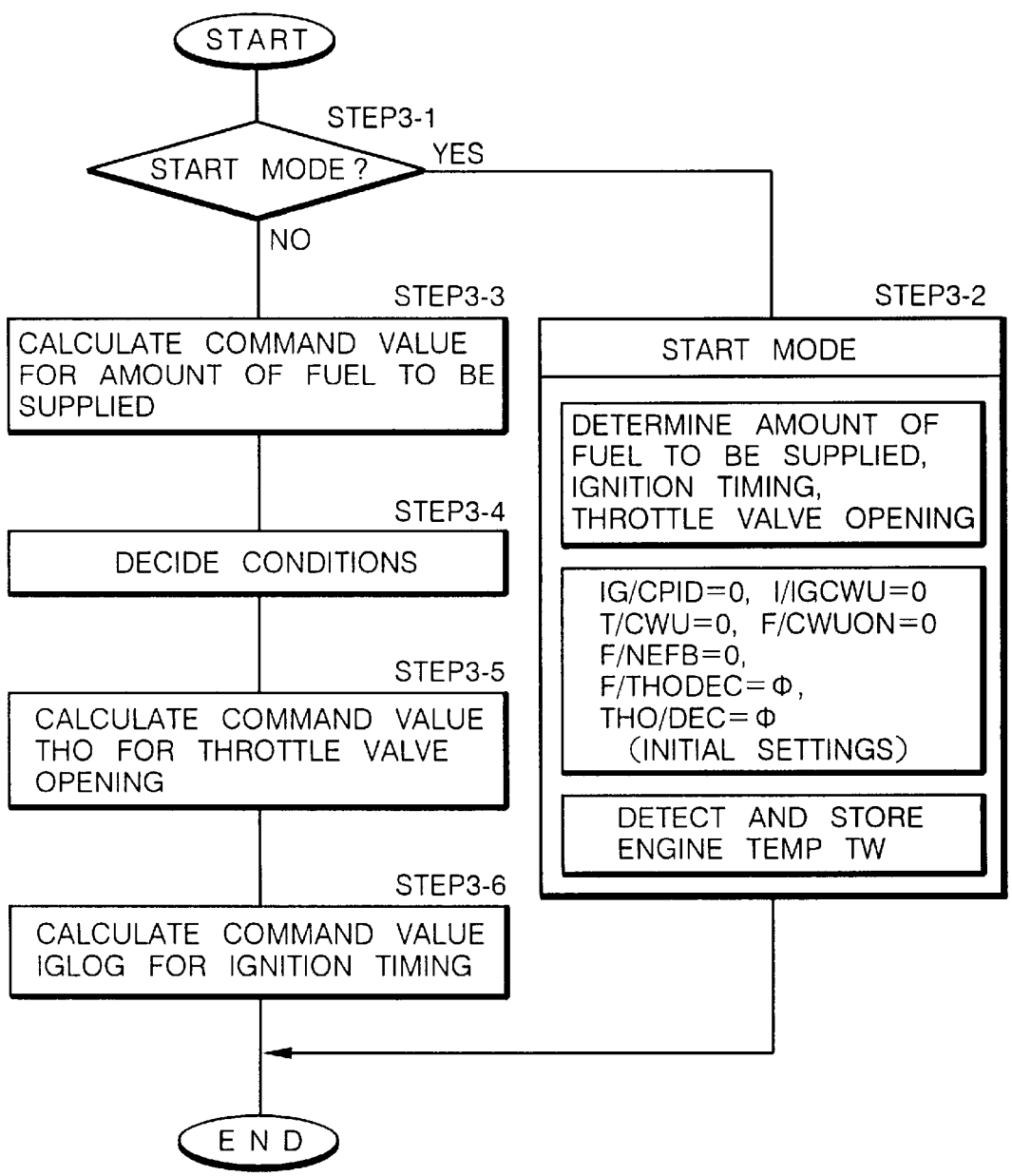
FIG. 3 is a flowchart of a control process as a main routine carried out by the control system shown in FIG. 1.

When the control system is started while the internal combustion engine 1 is at rest, the controller 2 executes a main routine shown in FIG. 3 in successive control cycles, each equal to a crank angle period (=an interval between TDCs).

In the main routine, the controller 2 decides whether the operation mode of the control system is the start mode or not in STEP3-1. The controller 2 makes this decision by seeing if a so-called full combustion in the internal combustion engine 1 is confirmed or not. The operation mode of the control system remains to be the start mode until a full combustion is confirmed. The controller 2 confirms a full combustion based on an output signal (rotational speed NE) from the rotational speed sensor 4.

If the operation mode of the control system is the start mode in STEP3-1, then the controller 2 effects a start mode process for operating the internal combustion engine 1 in the start mode in STEP3-2, after which the present control cycle is finished.

In the start mode process, the controller 2 determines command values for the amount of fuel to be supplied to, and the ignition timing and the throttle valve opening THO, of the internal combustion engine 1 based on detected signals from the sensors 4–8, given maps and equations. According to the determined command values, the controller 2 operates the fuel supply device 11, the ignition device 10, and the throttle valve actuator 12, and cranks the internal combustion engine 1 with the starter motor for thereby starting the internal combustion engine 1.

In the start mode process, the controller 2 initializes various parameters such as flags for controlling the internal combustion engine 1 in the CWU mode.

The parameters that are initialized include a retarding corrective quantity IG/CPID(n) ("n" in parentheses indicates a control cycle number) for the ignition timing, an integral term I/IGCWU(n) for determining the retarding corrective quantity IG/CPID(n) according to PI control, a measured time value T/CWU (hereinafter referred to as a "CWU elapsed time T/CWU") of a count-up timer which measures a time elapsed in the CWU mode (a time elapsed after the start mode has ended), a flag F/CWUON (hereinafter referred to as a "CWU indication flag F/CWUON") for indicating whether the operation mode is the CWU mode or not, a flag F/NEFB (hereinafter referred to as a "retarding correction indication flag F/NEFB") for indicating whether or not correction of the ignition timing to retard the same is to be carried out or being carried out, a flag F/THODEC (hereinafter referred to as an "increase correction flag F/THODEC") for indicating whether a command value IGLOG for the ignition timing, to be determined as described later on, is on a retarded side of a certain threshold, and the throttle valve opening THO (the increase in the quantity of intake air) is to be reduced or not in the CWU mode, and a corrective quantity THO/DEC (corresponding to a corrective quantity for the increase in the quantity of intake air and hereinafter referred to as a "throttle corrective quantity THO/DEC") for the throttle valve opening THO in the correction of the increase in the quantity of intake air. These parameters are set to "0" when they are initialized.

When the CWU indication flag F/CWUON is "0", it indicates that the operation mode is the normal mode, and when the CWU indication flag F/CWUON is "1", it indicates that the operation mode is the CWU mode. When the retarding correction indication flag F/NEFB is "0", it indicates that correction of the ignition timing to retard the same is not to be carried out, and when the retarding correction indication flag F/NEFB is "1", it indicates that correction of the ignition timing to retard the same is to be carried out or being carried out. When the increase correction flag F/THODEC is "0", it indicates that the throttle valve opening THO is not to be reduced, and when the increase correction flag F/THODEC is "1", it indicates that the throttle valve opening THO is to be reduced.

In the start mode, the engine temperature TW of the internal combustion engine 1 at the time the internal combustion engine 1 is started is detected by the engine temperature sensor 5, and stored in a memory (not shown).

If the operation mode is not the start mode in STEP3-1, i.e., if a fully combusted state of the internal combustion engine 1 is confirmed, then the controller 2 calculates a command value for the amount of fuel to be supplied to the internal combustion engine 1 in STEP3-3. The decision means 16 decides conditions as to whether the internal combustion engine 1 is to be controlled in the CWU mode or not in STEP3-4. Thereafter, the intake air quantity control means 13 calculates a command value THO for the throttle valve opening in STEP3-5. The ignition timing control means 15 calculates a command value IGLOG for the ignition timing in STEP3-6. Thereafter, the present control cycle is finished.

For calculating a command value for the amount of fuel to be supplied to the internal combustion engine 1 in STEP3-3, the controller 2 determines a basic amount of fuel to be supplied, using a predetermined map, from the rotational speed NE detected by the rotational speed sensor 4 and the intake pressure PB detected by the intake pressure sensor 6. Then, the controller 2 corrects the basic amount of fuel to be supplied depending on the engine temperature TW detected by the engine temperature sensor 5 and the atmospheric temperature TA detected by the atmospheric temperature sensor 7, for thereby calculating a command value for the amount of fuel to be supplied to the internal combustion engine 1.

The calculated command value for the amount of fuel to be supplied is supplied from the controller 2 to the fuel supply device 11, which supplies the amount of fuel to the internal combustion engine 1 according to the supplied command value.

Figure 4:
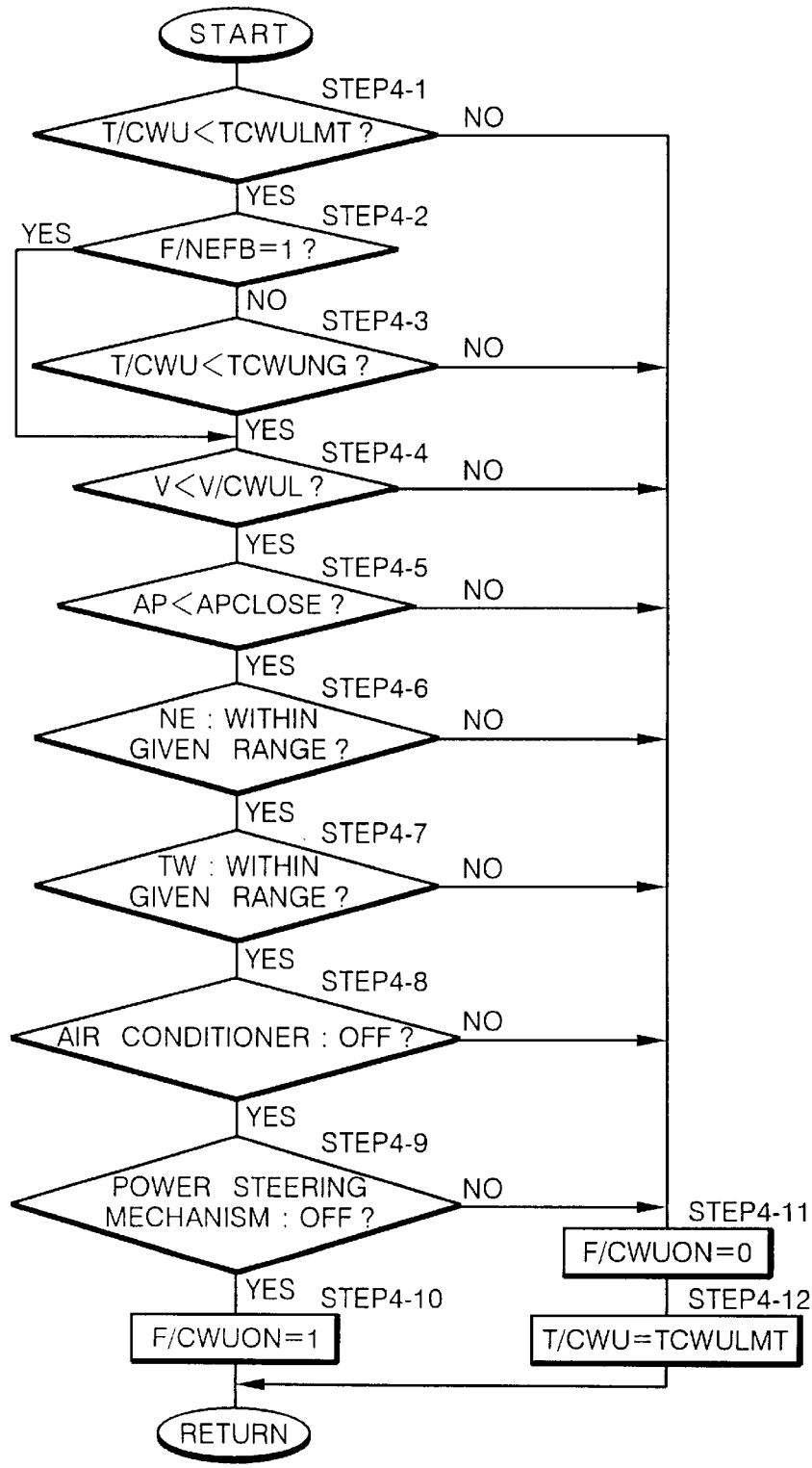
FIG. 4 is a flowchart of a subroutine in the main routine shown in FIG. 3.

For deciding conditions in STEP3-4, the decision means 16 executes a subroutine shown in FIG. 4 as follows:

The decision means 16 decides whether the present CWU elapsed time T/CWU is shorter than a predetermined limit time TCWULMT or not (T/CWU<TCWULMT or not) in STEP4-1. If T/CWU≧TCWULMT, then the decision means 16 sets the CWU indication flag F/CWUON to "0", setting the operation mode to the normal mode in STEP4-11, and thereafter forcibly sets the CWU elapsed time T/CWU to the limit time TCWULMT in STEP4-12. The limit time TCWULMT is selected to be a period of time in which the quantity of intake air supplied to the internal combustion engine 1 can be increased and the ignition timing can be retarded (CWU mode) for achieving a temperature high enough to activate the catalytic converter 3 sufficiently.

Figure 10:
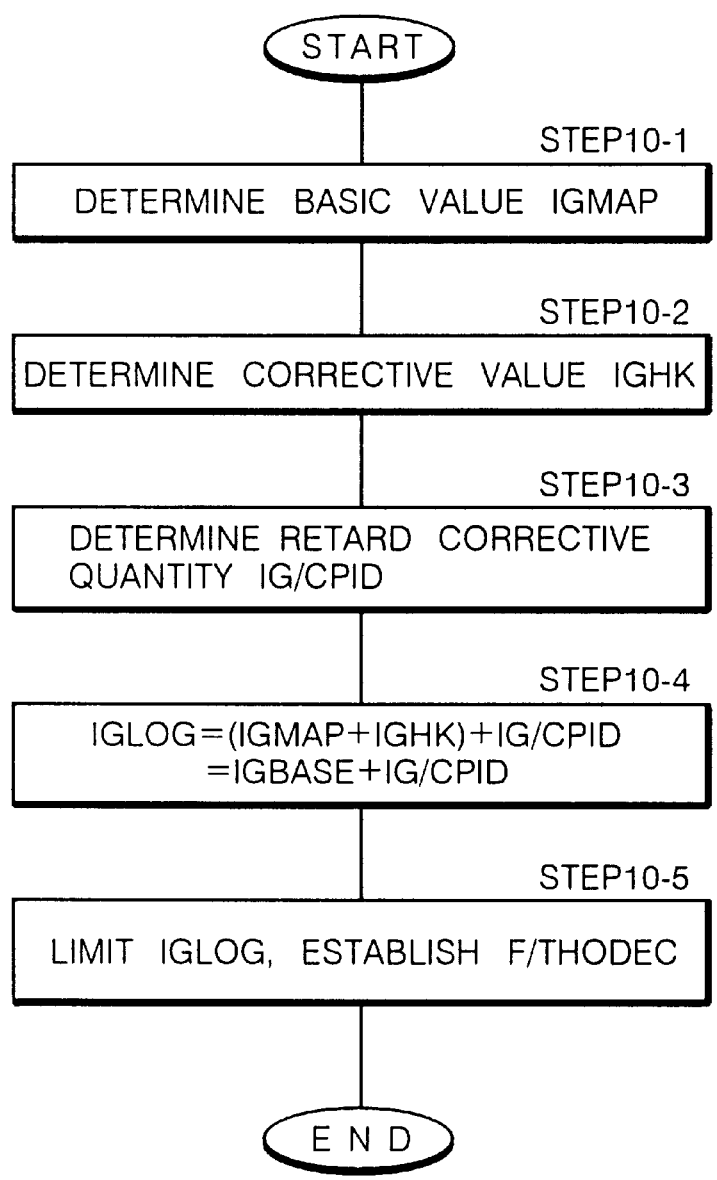
FIG. 10 is a flowchart of still another subroutine in the main routine shown in FIG. 3.

If T/CWU<TCWULMT in STEP4-1, then the decision means 16 decides a present value of the retarding correction indication flag F/NEFB which is set in a subroutine (see FIG. 10) for calculating a retarding corrective quantity, as described later on, in STEP4-2. If F/NEFB=0, the decision means 16 decides whether the present CWU elapsed time T/CWU is shorter than a predetermined limit time TCWUNG (which is shorter than the limit time TCWULMT used in STEP4-1) in STEP4-3. If the T/CWU≧TCWUNG, i.e., if the time (=the elapsed time T/CWU) that has elapsed after the start mode ended is equal to or longer than the limit time TCWUNG while the ignition timing is not to be retarded (F/NEFB=0), then STEP 4-11, STEP4-12 are executed (the normal mode is established).

If F/NEFB=1 in STEP4-2 or T/CWU<TCWUNG in STEP4-3, then the decision means 16 decides whether a detected value of the motor vehicle speed V, produced by the vehicle speed sensor 9, is smaller than a predetermined value V/CWUL, indicating that the motor vehicle is at rest, in STEP4-4. Then, the decision means 16 decides whether a detected value of the movement AP of the accelerator pedal, produced by the accelerator pedal depression sensor 8, is smaller than a predetermined value APCLOSE, indicating that the accelerator pedal is in a substantially fully closed position, in STEP4-5. If the conditions in STEP 4-4, STEP4-5 are not met, i.e., if the internal combustion engine 1 is not idling, then STEP4-11, STEP4-12 are executed (the normal mode is established).

If the conditions in STEP4-4, STEP4-5 are met, i.e., if the internal combustion engine 1 is idling, then the decision means 16 decides whether a detected value of the rotational speed NE, produced by the rotational speed sensor 4, falls within a predetermined range or not in STEP4-6, and then decides whether a detected value of the engine temperature TW, produced by the engine temperature sensor 5, falls within a predetermined range or not in STEP4-7. If the conditions in STEP4-6, STEP4-7 are not met, i.e., if the internal combustion engine 1 is not idling, then STEP4-11, STEP4-12 are executed (the normal mode is established).

If the conditions in STEP4-6, STEP4-7 are met, then the decision means 16 decides whether the air conditioner (more precisely, a compressor associated with the air conditioner) and the power steering system (more precisely, an oil pump associated with the power steering system) are turned off or not, i.e., whether a clutch of the compressor is disengaged and the oil pump associated with the power steering system is under no load, in STEP4-8, STEP4-9. If either the air conditioner or the power steering system is not turned off, but is operating, then STEP4-11, STEP4-12 are executed (the normal mode is established). If the conditions in STEP4-8, STEP4-9 are met, i.e., if all the conditions in STEP4-1 - STEP4-9 are met, the CWU indication flag F/CWUON is set to "1", setting the operation mode of the control system to the CWU mode in STEP4-10.

After the internal combustion engine 1 has started to operate, if the states of the air conditioner and the power steering system, which serve as loads on the internal combustion engine 1, the rotational speed NE, the engine temperature TW, and the CWU elapsed time T/CWU satisfy the conditions in STEP4-1 - STEP4-9, as determined by the decision means 16, then the CWU mode is established (the CWU indication flag F/CWUON=1).

If the air conditioner and the power steering system are to be actuated immediately after the internal combustion engine 1 has started to operate, or if the air conditioner and the power steering system are to be actuated while the control system is in the CWU mode, then since the conditions in STEP4-4, STEP4-5, STEP4-8, STEP4-9 are not met, the operation mode of the control system is set to the normal mode immediately after the internal combustion engine 1 has started to operate, or the CWU mode is canceled and the normal mode is established (the CWU indication flag F/CWUON=0).

Similarly, if the rotational speed NE and the engine temperature TW are too high or too low, then since the conditions in STEP4-6, STEP4-7 are not met, the operation mode of the control system is set to the normal mode immediately after the internal combustion engine 1 has started to operate, or the CWU mode is canceled and the normal mode is established (the CWU indication flag F/CWUON=0).

If the time (=CWU elapsed time T/CWU) that has elapsed when the internal combustion engine 1 operates in the CWU mode is longer than the limit time TCWULMT (the condition in STEP4-1 is not met), or if the CWU elapsed time T/CWU is longer than the limit time TCWUNG when the ignition timing is not to be retarded (F/NEFB=0) (the condition in STEP4-3 is not met, a state which occurs when the rotational speed NE of the internal combustion engine 1 does not reach a preset rotational speed due to the nature of the fuel, for example), then the CWU mode is canceled and the normal mode is established (the CWU indication flag F/CWUON=0). Therefore, if the rotational speed of the internal combustion engine 1 does not increase quickly enough, or stated otherwise, if the fuel is not combusted well, then the CWU mode is canceled to stabilize the combustion of the fuel in the internal combustion engine 1.

Once the normal mode is established, as long as the internal combustion engine 1 operates continuously, the CWU elapsed time T/CWU is held to the limit time TCWULMT in STEP4-12. Subsequently, the condition in STEP4-1 is met until the internal combustion engine 1 is started again (the CWU elapsed time T/CWU is initialized only in the start mode), and hence the CWU mode is not established while the motor vehicle is running or while the internal combustion engine 1 is idling when the motor vehicle is temporarily at rest, i.e., while the internal combustion engine 1 is idling normally.

The CWU mode is established only while the internal combustion engine 1 is idling for the first time after it has started to operate, under certain conditions of the loads on the internal combustion engine 1, the rotational speed NE, and the engine temperature TW, and within the limit time TCWULMT.

In this embodiment, the engine temperature TW, which is used as a condition for the CWU mode, is employed to represent the temperature of the catalytic converter 3. However, the temperature of the catalytic converter 3 may directly be detected, and used as a condition for the CWU mode.

Though not specifically described in this embodiment, the operation mode of the control system may be prevented from being set to the CWU mode until a certain period of time elapses after the start mode has ended.

A process of calculating a command value THO for the throttle valve opening in STEP3-5 shown in FIG. 3 will be described below. The process of calculating a command value THO for the throttle valve opening is carried out by the intake air quantity control means 13 according to a subroutine shown in FIG. 5.

Figure 5:
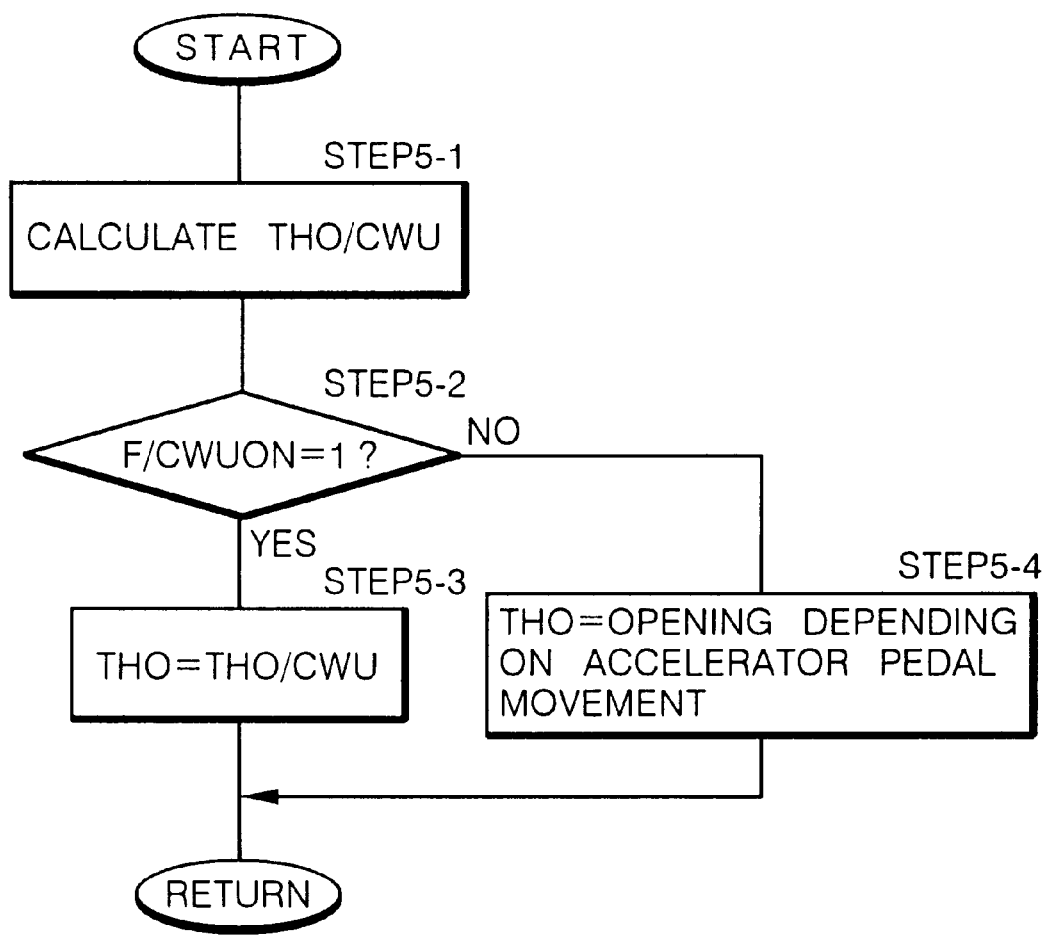
FIG. 5 is a flowchart of another subroutine in the main routine shown in FIG. 3.

In STEP5-1 shown in FIG. 5, the intake air quantity control means 13 calculates a command value THO/CWU for the throttle valve opening in the CWU mode based on the engine temperature TW detected by the engine temperature sensor 5 and the CWU elapsed time T/CWU.

Figure 6:
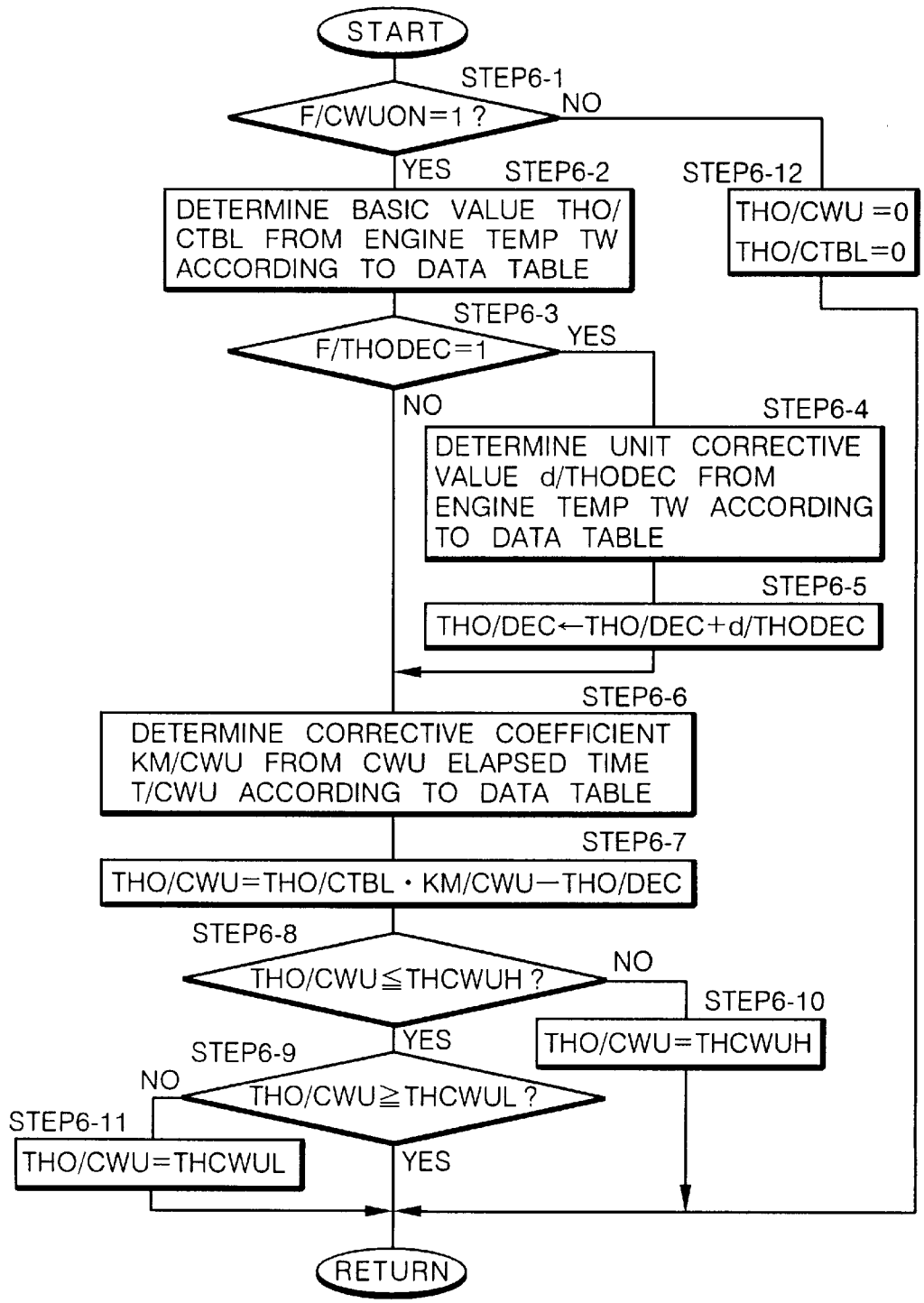
FIG. 6 is a flowchart of a subroutine in the subroutine shown in FIG. 5.
Figure 7:
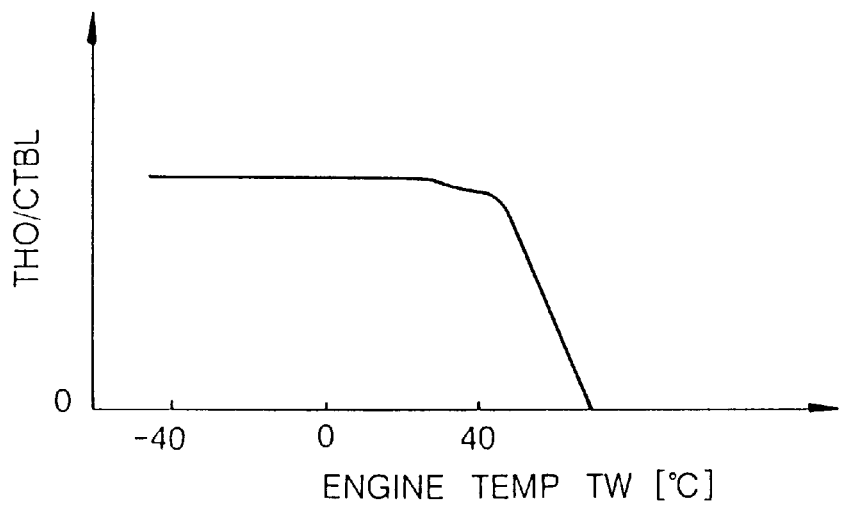
FIG. 7 is a diagram of a data table used in the subroutine shown in FIG. 6.

The calculation of the command value THO/CWU in STEP5-1 is carried out according to a subroutine shown in FIG. 6. As shown in FIG. 6, the intake air quantity control means 13 decides the value of the CWU indication flag F/CWUON in STEP6-1. If F/CWUON=1, i.e., if the operation mode has been set to the CWU mode in STEP3-4, then the intake air quantity control means 13 determines a basic value THO/CTBL for the command value THO/CWU for the throttle valve opening in order to increase the quantity of intake air to be drawn into the internal combustion engine 1 to a value greater than when the internal combustion engine 1 idles normally, in the CWU mode, from the detected value of the engine temperature TW which has been produced in the start mode, according to a predetermined data table shown in FIG. 7, in STEP6-2. As shown in FIG. 7, the data table indicates that the basic value THO/CTBL for the command value THO/CWU for the throttle valve opening is substantially constant in low and medium ranges of engine temperatures TW, and decreases in a high range of engine temperatures TW.

Then, the intake air quantity control means 13 decides a present value of the increase correction flag F/THODEC, which will be established by a process (FIG. 11) of limiting a command value for the ignition timing IGLOG, in STEP6-3. If F/THODEC=0, i.e., if the throttle valve opening THO is not to be reduced, then control goes to STEP6-6.

Figure 8:
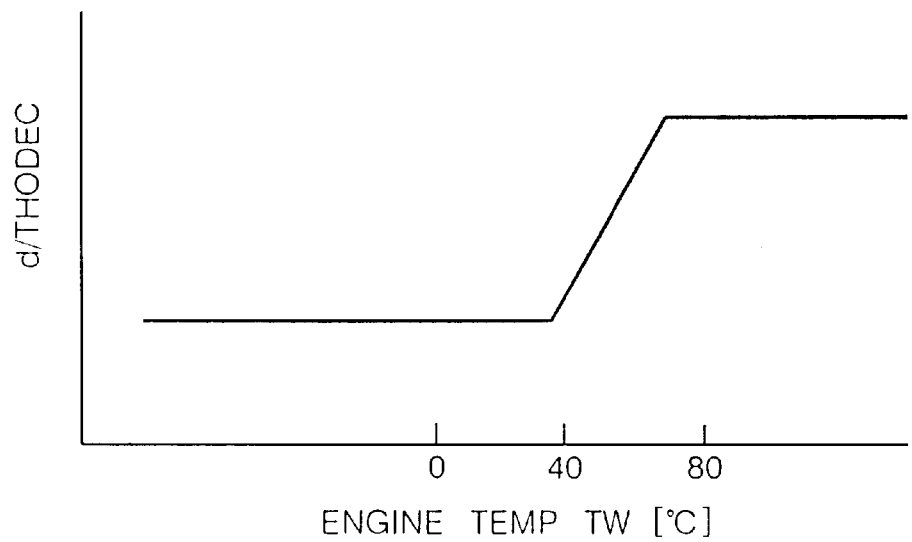
FIG. 8 is a diagram of another data table used in the subroutine shown in FIG. 6.

If F/THODEC=1, i.e., if the throttle valve opening THO is to be reduced, then the intake air quantity control means 13 determines a unit corrective value d/THODEC (>0) for the throttle valve opening THO in each control cycle from the detected value of the engine temperature TW which has been produced in the start mode (indicative of a warmed-up state of the internal combustion engine 1 at the time it starts), according to a predetermined data table shown in FIG. 8, in STEP6-4. As shown in FIG. 8, the data table indicates that the unit corrective value d/THODEC is of a relatively small value in low and medium ranges of engine temperatures TW, and increases in a high range of engine temperatures TW. The intake air quantity control means 13 then adds the unit corrective value d/THODEC to the present corrective quantity THO/DEC (which has been initialized to "0" in the start mode) for the throttle valve opening THO, thus updating the corrective quantity THO/DEC, in STEP6-5, after which control proceeds to STEP6-6.

Figure 9:
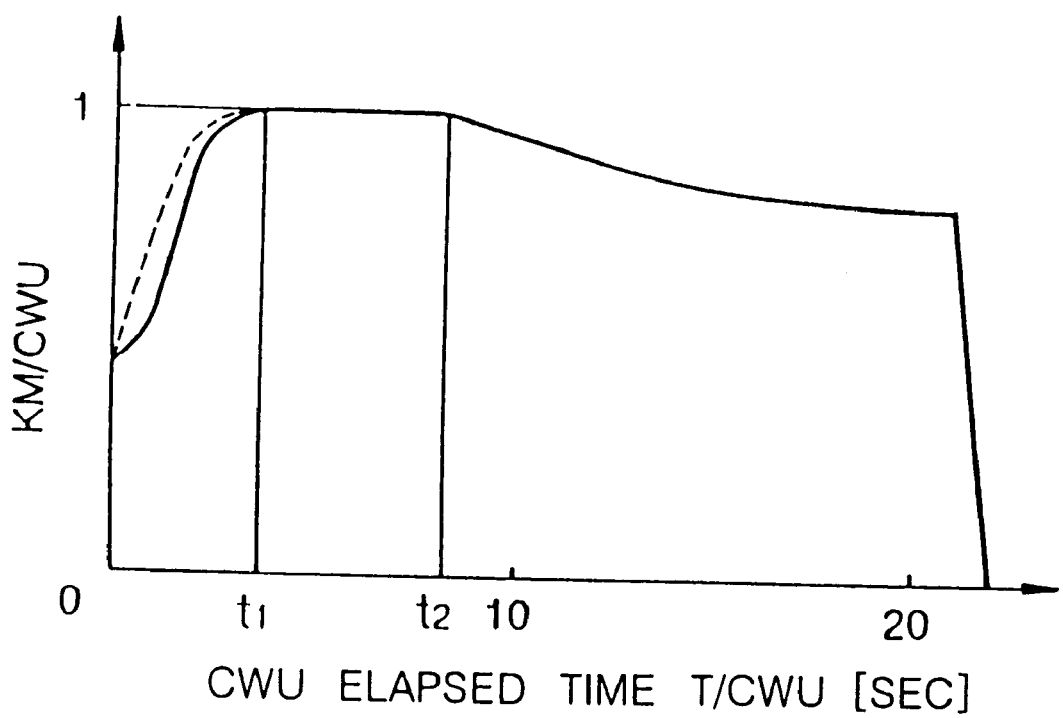
FIG. 9 is a diagram of still another data table used in the subroutine shown in FIG. 6.

In STEP6-6, the intake air quantity control means 13 determines a basic value corrective coefficient KM/CWU for correcting the basic value THO/CTBL determined in STEP6-2, from the CWU elapsed time T/CWU according to a predetermined data table (time table) shown in FIG. 9. The basic value corrective coefficient KM/CWU is a coefficient (≦1) by which the basic value THO/CTBL is multiplied, for thereby correcting the basic value THO/CTBL. The data table shown in FIG. 9 indicates that the basic value corrective coefficient KM/CWU progressively increases with time toward a maximum value "1" in an initial stage (from a time 0 to a time t1) of the CWU elapsed time T/CWU, is subsequently held to the maximum value "1" for a certain period of time (from the time t1 to a time t2), and then progressively decreases with time.

The data table shown in FIG. 9 may be composed of different data tables, one used when the shift lever of the automatic transmission of the motor vehicle is in an N range (neutral range) and one used when the shift lever is in a D range (drive range). Such different data tables may be employed because the internal combustion engine 1 is subject to different loads in the N and D ranges, and the combusted state of the internal combustion engine 1 may be controlled optimally by using different data tables depending on the load on the internal combustion engine 1.

In the data table shown in FIG. 9, the basic value corrective coefficient KM/CWU may be progressively increased according to a dotted-line pattern in the initial stage (from the time 0 to the time t1) of the CWU elapsed time T/CWU, depending on the characteristics of the internal combustion engine 1 after it has started to operate.

The intake air quantity control means 13 multiplies the basic value THO/CTBL for the command value THO/CWU for the throttle valve opening, determined in STEP6-2, by the basic value corrective coefficient KM/CWU determined in STEP6-6, and subtracts the present corrective quantity THO/DEC (if F/THODEC=0 in STEP6-3) or the corrective quantity THO/DEC updated in STEP6-5 (if F/THODEC=1 in STEP6-3) from the product, thereby calculating a command value THO/CWU for the throttle valve opening in the CWU mode, in STEP6-7.

The intake air quantity control means 13 decides whether the command value THO/CWU calculated in STEP6-7 falls in a range between a predetermined upper limit value THCWUH and a predetermined lower limit value THCWUL in STEP 6-8, STEP6-9. If the command value THO/CWU is greater than the upper limit value THCWUH or smaller than the lower limit value THCWUL, then the intake air quantity control means 13 limits the command value THO/CWU to the upper limit value THCWUH in STEP 6-10 or the lower limit value THCWUL in STEP 6-11.

If F/CWUON=0 in STEP6-1, i.e., if the operation mode has been set to the normal mode in STEP3-4, then the command value THO/CWU and the basic value corrective coefficient KM/CWU are cleared to "0" in STEP6-12.

Referring back to FIG. 5, after having determined the command value THO/CWU for the throttle valve opening in the CWU mode, the intake air quantity control means 13 decides the value of the CWU indication flag F/CWUON in STEP5-2. If F/CWUON=1, i.e., if the operation mode has been set to the CWU mode, then the intake air quantity control means 13 determines, in STEP5-3, the final command value THO for the throttle valve opening as the command value THO/CWU determined in STEP5-1. If F/CWUON=0 in STEP5-2, i.e., if the operation mode has been set to the normal mode, then the intake air quantity control means 13 decides the final command value THO for the throttle valve opening as a value depending on the detected value of the movement AP of the accelerator pedal in STEP5-4. The command value THO for the throttle valve opening depending on the movement AP of the accelerator pedal in the normal mode is "0" when the internal combustion engine 1 idles normally with the accelerator pedal not depressed, and is smaller than the opening command value THO/CWU that is determined depending on the engine temperature TW and the CWU elapsed time T/CWU in the CWU mode, as described above.

As described above, if the operation mode has been set to the CWU mode in STEP3-4 after the internal combustion engine 1 has started to operate, then the command value THO for the throttle valve opening is determined depending on the engine temperature TW and the CWU elapsed time T/CWU, and if the operation mode has been set to the normal mode, then the command value THO for the throttle valve opening is determined depending on the movement AP of the accelerator pedal. The controller 2 supplies the command value THO thus determined to the throttle valve actuator 12, which actuates the throttle valves according to the supplied command value THO. The quantity of intake air supplied to the internal combustion engine 1 is now controlled according to the command value THO.

Since the command value THO for the throttle valve opening while the internal combustion engine 1 is idling in the CWU mode is determined as being larger than the command value while the internal combustion engine 1 is idling normally in the normal mode such as when the motor vehicle is temporarily at rest, the quantity of intake air Adrawn into the internal combustion engine 1 is greater than when the internal combustion engine 1 is idling normally.

If the corrective quantity THO/DEC for the throttle valve opening is "0" (the increase in the quantity of intake air is not corrected), the command value THO (=THO/CWU) for the throttle valve opening in the CWU mode progressively increases toward the basic value THO/CTBL in an initial stage immediately after the CWU mode has started, then is continuously held to the basic value THO/CTBL, and thereafter progressively decreases from the basic value THO/CTBL, as indicated by the solid-line curve in the upper section of FIG. 2, due to the above-described characteristics of the basic value corrective coefficient KM/CWU in the time table shown in FIG. 9. The quantity of intake air drawn into the internal combustion engine 1 increases in the same pattern to a level greater than when the internal combustion engine 1 is idling normally. Therefore, the value produced by multiplying the basic value THO/CTBL by the basic value corrective coefficient KM/CWU governs the basic pattern according to which the quantity of intake air is increased by the intake air quantity control means 13 in this embodiment. The increase in the quantity of intake air depends on the engine temperature TW as the basic value THO/CTBL is established according to the engine temperature TW at the time the internal combustion engine 1 is started.

If the corrective quantity THO/DEC is not "0" (THO/DEC>0), the throttle valve opening THO is reduced by the corrective quantity THO/DEC with respect to a basic throttle valve opening which is determined by the basic value THO/CTBL and the basic value corrective coefficient KM/CWU (see STEP6-7), so that the increase in the quantity of intake air is corrected so as to be reduced with respect to a basic increase. If the increase correction flag F/THODEC is "1" (in this case, the command value IGLOG for the ignition timing which is determined by the feedback control process (PI control process) is on a retarded side of a certain threshold, then since the corrective quantity THO/DEC is incremented by the unit corrective value d/THODEC in each control cycle in STEP6-5, the quantity by which the increase in the quantity of intake air is reduced is increased in each control cycle by a value corresponding to the unit corrective value d/THODEC.

If the increase correction flag F/THODEC changes from "1" to "0" (as described in detail later on) while the corrective quantity THO/DEC is increasing by the unit corrective value d/THODEC, then since the process of STEP6-5 is not carried out, the corrective quantity THO/DEC is not updated, but is held to the present value.

A process of calculating a command value IGLOG for the ignition timing of the internal combustion engine 1 in STEP3-6 shown in FIG. 3 will be described below. The process of calculating a command value IGLOG for the ignition timing is carried out by the target rotational speed setting means 14 and the ignition timing control means 15 according to a subroutine shown in FIG. 10.

The ignition timing control means 15 determines a basic value IGMAP for the ignition timing in STEP10-1. The basic value IGMAP can be determined according to a predetermined map from a detected value of the rotational speed NE and a detected value of the intake pressure PB, for example, of the internal combustion engine 1.

Then, the ignition timing control means 15 determines a corrective value IGHK for correcting the basic value IGMAP depending on a detected value of the engine temperature TW and a detected value of the atmospheric temperature TA, according to a map and equations from those detected values in STEP10-2. The corrective value IGHK corrects the basic value IGMAP by being added to the basic valve IGMAP. The ignition timing that is determined by a value (IGMAP+IGHK) which is the sum of the basic value IGMAP and the corrective value IGHK is the same as the advanced ignition timing IGBASE (IGBASE=IGMAP+IGHK) indicated by the dot-anddash line in the middle section of FIG. 2, and corresponds to the advanced ignition timing for properly operating the internal combustion engine 1 in the normal mode. The ignition timing IGBASE will hereinafter referred to as a "normal ignition timing IGBASE".

Figure 11:
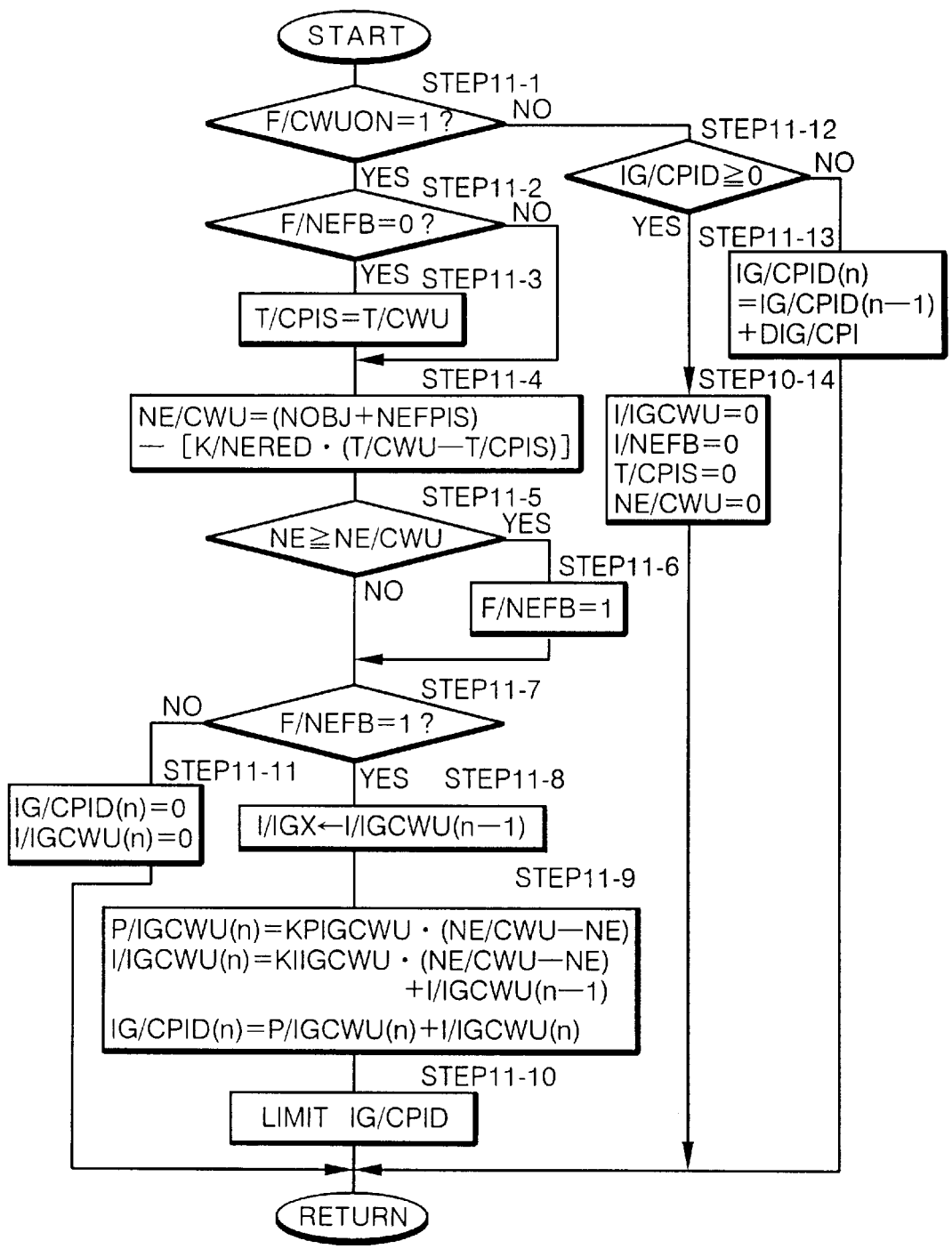
FIG. 11 is a flowchart of a subroutine in the subroutine shown in FIG. 10.

Then, the ignition timing control means 15 calculates the retarding corrective quantity IG/CPID for correcting the normal ignition timing IGBASE in STEP10-3. The calculation of the retarding corrective quantity IG/CPID in STEP10-3 is carried out according to a subroutine shown in FIG. 11. As shown in FIG. 11, the ignition timing control means 15 decides the value of the CWU indication flag F/CWUON in STEP11-1. If F/CWUON=1, i.e., if the operation mode has been set to the CWU mode, the ignition timing control means 15 decides the present value of the retarding correction indication flag F/NEFB in STEP11-2. If F/NEFB=0, i.e., if the ignition timing does not start to be retarded, then the ignition timing control means 15 sets the value of a parameter T/CPIS for grasping the time to start retarding the ignition timing, to the present CWU elapsed time T/CWU in STEP11-3. If F/NEFB=1 in STEP11-2, then the process of STEP11-3 is not carried out. When the value of the retarding correction indication flag F/NEFB changes from "0" to "1", i.e., at the time to start retarding the ignition timing, the value of the parameter T/CPIS is held to the CWU elapsed time T/CWU at the time (more precisely, one control cycle prior to the time).

Thereafter, the ignition timing control means 15 controls the target rotational speed setting means 14 to calculate a target rotational speed NE/CWU for the internal combustion engine 1 in STEP11-4. The target rotational speed setting means 14 calculates a target rotational speed NE/CWU according to the following equation (1):

$$\text{NE/CWU} = \text{NOBJ} + \text{NECPIS} - [\text{K/NERED} \cdot (\text{T/CWU} - \text{T/CPIS})] \quad (1)$$

where NOBJ represents an idling speed NOBJ (a predetermined target rotational speed when the internal combustion engine 1 idles) in the lower section of FIG. 2, the term (NOBJ+NECPIS) indicates the preset rotational speed that is higher than the predetermined idling speed NOBJ by the predetermined value NECPIS, and (T/CWU−T/CPIS), i.e., the difference between the CWU elapsed time T/CWU and the value of the parameter T/CPIS, is (T/CWU−T/CPIS)=0 due to the process of STEP11-3 if the retarding correction indication flag F/NEFB is "0" (at this time, NE/CWU= NOBJ+NECPIS=preset rotational speed). After the retarding correction indication flag F/NEFB changes from "0" to "1", the difference between the CWU elapsed time T/CWU and the value of the parameter T/CPIS indicates a period of time that has elapsed from the time when the retarding correction indication flag F/NEFB changes from "0" to "1" (this time is equal to the time when the rotational speed NE of the internal combustion engine 1 has reached the preset rotational speed (NOBJ+NECPIS)). In the equation (1), K/NERED represents a coefficient (>0) that determines a rate (gradient) at which to lower the target rotational speed NE/CWU from the preset rotational speed (NOBJ+NECPIS) toward the idling speed NOBJ, as described above with reference to FIG. 2.

For determining the target rotational speed NE/CWU according to the equation (1), a lower limit for the target rotational speed NE/CWU is set to the idling speed NOBJ, and when the calculated result of the right-hand side of the equation (1) becomes smaller than the idling speed NOBJ, the target rotational speed NE/CWU is subsequently held to the idling speed NOBJ.

After the target rotational speed NE/CWU has been determined by the target rotational speed setting means 14, the ignition timing control means 15 compares the present detected value of the rotational speed NE with the target rotational speed NE/CWU in STEP11-5. If NE<NE/CWU, then control proceeds to STEP11-7. If NE≧NE/CWU, then the retarding correction indication flag F/NEFB is set to "1" in STEP11-6, from which control proceeds to STEP11-7.

If the retarding correction indication flag F/NEFB is "0", then since the target rotational speed NE/CWU calculated in STEP11-4 is the preset rotational speed (NOBJ+NECPIS), the retarding correction indication flag F/NEFB changes from "0" to "1" when the rotational speed NE increases up to the preset rotational speed (NOBJ+NECPIS). After the retarding correction indication flag F/NEFB has changed from "0" to "1", i.e., after the rotational speed NE has increased up to the preset rotational speed (NOBJ+ NECPIS), the target rotational speed NE/CWU calculated in STEP11-4 progressively decreases at a given rate from the preset rotational speed (NOBJ+NECPIS) toward the idling speed NOBJ. After having reduced to the idling speed NOBJ, the target rotational speed NE/CWU is held to the idling speed NOBJ. This pattern of time-depending changes in the target rotational speed NE/CWU is indicated by the brokenline curve in the lower section of FIG. 2.

In STEP11-7, the ignition timing control means 15 decides the present value of the retarding correction indication flag F/NEFB. If F/NEFB=1, i.e., if the rotational speed NE has reached the preset rotational speed (NOBJ+ NECPIS), then the ignition timing control means 15 stores the value of an integral term I/IGCWU(n−1) calculated when the retarding corrective quantity IG/CPID(n) is determined in the preceding control cycle according to the PI control process, as the value of a parameter I/IGX in STEP11-8. The ignition timing control means 15 then calculates a proportional term P/IGCWU(n) and an integral term I/IGCWU(n) for determining the retarding corrective quantity IG/CPID(n) in the present control cycle, based on the difference (NE/CWU−NE) between the present target rotational speed NE/CWU and the detected value of the rotational speed NE, according to the following equations (2), (3), respectively:

$$P/IGCWU(n) = KPIGCWU \cdot (NE/CWU - NE) \quad (2)$$

$$I/IGCWU(n) = KIIGCWU \cdot (NE/CWU - NE) + I/IGCWU(n-1) \quad (3)$$

where KPIGCWU, KIIGCWU represent gain coefficients respectively for the proportional and integral terms. The ignition timing control means 15 adds the proportional term P/IGCWU(n) and the integral term I/IGCWU(n) to each other according to the following equation (4) for thereby calculating the retarding corrective quantity IG/CPID(n) in the present control cycle in STEP11-9:

$$IG/CPID(n) = P/IGCWU(n) + I/IGCWU(n) \quad (4)$$

The ignition timing control means 15 establishes upper and lower limits for the retarding corrective quantity IG/CPID(n) determined in STEP11-9 in STEP11-10, whereupon the process in STEP10-3 in the present control cycle is completed.

If F/NEFB=0 in STEP11-7, i.e., if the rotational speed NE does not reach the preset rotational speed (NOBJ+NECPIS), then the values of the proportional term P/IGCWU(n) and the integral term I/IGCWU(n) in the present control cycle are set to "0" in STEP11-11, whereupon the process in STEP10-3 in the present control cycle is completed.

The retarding corrective quantity IG/CPID calculated in STEP11-9 is basically of a negative value because it is added to the normal ignition timing IGBASE to retard the ignition timing. Specifically, inasmuch as the rotational speed NE tends to be higher than the idling speed NOBJ because the quantity of intake air is increased by the intake air quantity control means 13, the retarding corrective quantity IG/CPID determined according to the PI control process (feedback control process) in order to converge the rotational speed NE toward the target rotational speed NE/CWU, i.e., to eliminate the difference (NE/CWU−NE) between the rotational speed NE toward the target rotational speed NE/CWU, serves to retard the normal ignition timing IGBASE for preventing the rotational speed NE from increasing. In the CWU mode, therefore, the retarding corrective quantity IG/CPID is calculated in the pattern indicated by the brokenline curve in the middle section of FIG. 2. In FIG. 2, because the shift lever of the automatic transmission of the motor vehicle is changed from the N range to the D range in the CWU mode, the load on the internal combustion engine 1 slightly increases, and the rotational speed NE slightly drops from the idling speed NOBJ, with the result that the magnitude (absolute value) of the retarding corrective quantity IG/CPID is smaller after the automatic transmission is shifted than before the automatic transmission is shifted.

If the CWU indication flag F/CWUON=0 (the normal mode) in STEP11-1, then the ignition timing control means 15 decides whether or not the present retarding corrective quantity IG/CPID is equal to or greater than "0" in STEP11-12. If present retarding corrective quantity IG/CPID neither equal to nor greater than "0" (IG/CPID<0), then the operation mode of the control system has just changed from the CWU mode in which the retarding corrective quantity IG/CPID is calculated in STEP11-9 to the normal mode. In this case, the ignition timing control means 15 calculates the retarding corrective quantity IG/CPID(n) in the present control cycle by adding the retarding corrective quantity IG/CPID(n−1) in the preceding control cycle and a predetermined value DIG/CPI (>0) to each other in STEP11-13. Thus, the retarding corrective quantity IG/CPID is advanced by the predetermined value DIG/CPI in each control cycle. A limit value for the retarding corrective quantity IG/CPID is set to "0", and if the sum IG/CPID(n−1)+DIG/CPI is greater than "0", then the retarding corrective quantity IG/CPID(n) in the present control cycle is set to "0".

If IG/CPID≧0 in STEP11-12, i.e., if the operation mode is set to the normal mode without calculating the retarding corrective quantity IG/CPID in STEP11-9 or if the retarding corrective quantity IG/CPID is finally set to "0" in STEP11-13 after the CWU mode changes to the normal mode, then the integral term I/IGCWU, the retarding correction indication flag F/NEFB, the parameter T/CPIS, and the target rotational speed NE/CWU are cleared to "0" in STEP11-14.

Referring back to FIG. 10, after having calculated the retarding corrective quantity IG/CPID, the ignition timing control means 15 adds the basic value IGMAP for the ignition timing determined in STEP10-1, the corrective value IGHK determined in STEP10-2, and the retarding corrective quantity IG/CPID determined in STEP10-3 to each other. Stated otherwise, the ignition timing control means 15 adds the retarding corrective quantity IG/CPID to the normal ignition timing IGBASE (=IGMAP+IGHK), thereby determining a command value IGLOG for the ignition timing in the present control cycle in STEP10-4. The command value IGLOG for the ignition timing thus determined (more precisely, the command value IGLOG for the ignition timing determined while the retarding correction indication flag F/NEFB is being set to "1") serves to converge the rotational speed NE toward the target rotational speed NE/CWU according to the PI control process (feedback control process).

Then, the ignition timing control means 15 limits the command value IGLOG to an allowable range for operating the internal combustion engine 1 (including the ignition device 10) normally, and establishes the increase correction flag F/THODEC (as described below) for determining a final command value for the ignition timing in STEP10-5.

Figure 12:
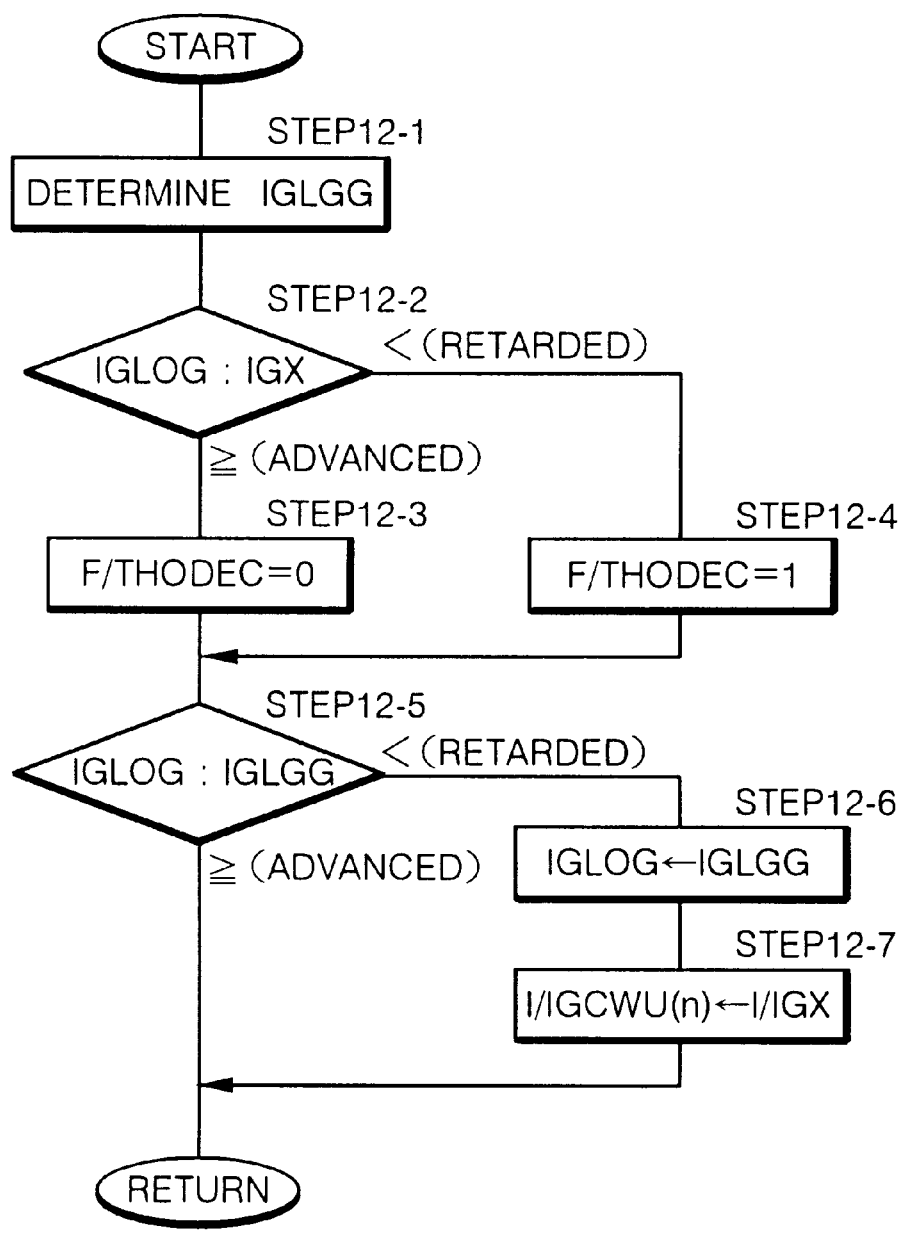
FIG. 12 is a flowchart of another subroutine in the subroutine shown in FIG. 10.

A process of limiting the command value IGLOG to an allowable range and establishing the increase correction flag F/THODEC in STEP10-5 will be described below with reference to a subroutine shown in FIG. 12.

The ignition timing control means 15 determines an allowable retarded limit IGLGG, which is a retarded limit value of an allowable range of the ignition timing, from the present engine temperature TW, etc. according to a data table in STEP12-1. Then, the ignition timing control means 15 compares a threshold IGX which is advanced a certain value from the allowable retarded limit IGLGG and the command value IGLOG determined in STEP10-4 with each other in STEP12-2. If IGLOG≧IGX, indicating that the command value IGLOG is more advanced than the threshold value IGX (IGLOG may be IGLOG=IGX), then the ignition timing control means 15 sets the increase correction flag F/THODEC used in STEP6-3 (see FIG. 6) to "0" in STEP12-3. If IGLOG<IGX, indicating that the command value IGLOG is more retarded than the threshold value IGX, then the ignition timing control means 15 sets the increase correction flag F/THODEC to "1" in STEP12-4.

Therefore, if the command value IGLOG for the ignition timing determined in STEP10-4 is more advanced than the threshold IGX in the present control cycle, then the corrective quantity THO/DEC is held to the preceding value in the process shown in FIG. 6 for determining a command value THO/CWU for the throttle valve opening in the CWU mode in a next control cycle. If the command value IGLOG for the ignition timing determined in STEP10-4 is more retarded than the threshold IGX, the corrective quantity THO/DEC is corrected to reduce the throttle valve opening by the unit corrective value d/THODEC in the process shown in FIG. 6 in a next control cycle.

After having established the increase correction flag F/THODEC, the ignition timing control means 15 compares the command value IGLOG determined in STEP10-4 with the allowable retarded limit IGLGG determined in STEP12-1 in STEP12-5. If the command value IGLOG is more advanced than the allowable retarded limit IGLGG (IGLOG≧IGLGG), i.e., if the command value IGLOG falls within the allowable range of the ignition timing, then the process shown in FIG. 12 is finished (the final command value IGLOG for the ignition timing is used as the value determined in STEP10-4). If the command value IGLOG is more retarded than the allowable retarded limit IGLGG and hence falls out of the allowable range of the ignition timing (IGLOG<IGLGG), then the ignition timing control means 15 forcibly limits the final command value IGLOG to the allowable retarded limit IGLGG in STEP12-6, and sets the present value I/IGCWU(n) of the integral term in the PI control process to the preceding value I/IGCWU(n-1) stored as the value of the parameter I/IGX in STEP11-8. Therefore, the value of the integral term I/IGCWU in the PI control process is held to the present value (the value in the preceding control cycle) if the command value IGLOG for the ignition timing determined in STEP10-4 is more retarded than the allowable retarded limit IGLGG.

After the final command value IGLOG for the ignition timing is determined by the ignition timing control means 15, the controller 2 supplies the determined command value IGLOG to the ignition device 10, which ignites the air-fuel mixture in the internal combustion engine 1 according to the supplied command value IGLOG.

According to the above control of the ignition timing, in the CWU mode, when the rotational speed NE reaches the preset rotational speed (NOBJ+NECPIS) after the internal combustion engine 1 has started to operate, the retarding corrective quantity IG/CPID is determined according to the PI control process in order to converge the rotational speed NE toward the target rotational speed NE/CWU (which will finally be equalized to the idling speed NOBJ) that is determined as described above, and the air-fuel mixture in the internal combustion engine 1 is ignited according to the command value IGLOG which has basically been corrected by the retarding corrective quantity IG/CPID. The ignition timing of the internal combustion engine 1 is thus controlled according to the feedback control process in order that the rotational speed NE thereof will be converted toward the target rotational speed NE/CWU (finally toward the idling speed NOBJ).

At this time, the quantity of intake air drawn into the internal combustion engine 1 has been increased to a value greater than when the internal combustion engine 1 idles normally, and the rotational speed NE thereof tends to be higher than the idling speed NOBJ. As a result, the retarding corrective quantity IG/CPID becomes a corrective quantity (IG/CPID<0) for retarding the ignition timing, as indicated by the broken-line curve in the middle section of FIG. 2, so that the ignition timing IGLOG is retarded as indicated by the solid-line curve in the middle section of FIG. 2.

If the operation mode of the control system change from the CWU mode to the normal mode (the CWU mode is canceled) as when the accelerator pedal is depressed while the internal combustion engine 1 is operating in the CWU mode, then the magnitude (absolute value) of the retarding corrective quantity IG/CPID determined in the CWU is progressively reduced as indicated by a right-hand portion of the middle section of FIG. 2 until it will finally becomes "0". Therefore, the ignition timing IGLOG progressively returns to the more advanced normal ignition timing IGBASE after the CWU mode is canceled.

When the control system according to the present invention operates in the manner described above, the quantity of intake air drawn into the internal combustion engine 1 is increased and the ignition timing thereof is retarded in the CWU mode after the has started to operate, so that the internal combustion engine 1 will generates a greater amount of heat than when it idles normally. As a consequence, the temperature of exhaust gases emitted from the internal combustion engine 1 is increased, increasing the temperature of the catalytic converter 3 for thereby activating the catalytic converter 3 quickly. After the internal combustion engine 1 has started operating, therefore, the catalytic converter 3 can achieve a desired level of emission purifying performance quickly for improved emission capability.

Inasmuch as the throttle valve opening is progressively increased to progressively increase the quantity of intake air in an initial stage of the process of increasing the quantity of intake air, the rotational speed NE can smoothly be increased immediately after the internal combustion engine 1 has started operating. Upon elapse of a certain time (at the time t2 in FIG. 9) after the quantity of intake air has started to increase, the throttle valve opening which determines the basic increase in the quantity of intake air, or more specifically, the basic throttle valve opening (=THO/CWU·KM/CWU) that is determined by the basic value THO/CWU and the basic value corrective coefficient KM/CWU, is progressively reduced with time according to the pattern shown in FIG. 9. Consequently, the tendency of the rotational speed NE to increase due to reduced friction of various parts of the internal combustion engine 1 can be suppressed without unduly retarding the ignition timing.

The basic value THO/CTBL (see FIG. 7) for the throttle valve opening is established depending on the engine temperature TW. Particularly in a high range of engine temperatures TW, the basic value THO/CTBL is reduced to reduce the increase in the quantity of intake air for thereby reducing the burden on the internal combustion engine 1 in the CWU mode in which the amount of heat generated thereby is relatively large.

For retarding the ignition timing in the CWU mode, the ignition timing starts to be retarded after the rotational speed NE has increased to the preset rotational speed (NOBJ+ NECPIS) that is higher than the idling speed NOBJ which is a final target value for the rotational speed NE. From the time when the ignition timing starts to be retarded, the target rotational speed NE/CWU is not immediately set to the idling speed NOBJ, but is progressively changed from the preset rotational speed (NOBJ+NECPIS) to the idling speed NOBJ. Thus, the ignition timing is prevented from being retarded quickly. In the initial stage of the process of retarding the ignition timing, therefore, the rotational speed NE of the internal combustion engine 1 is prevented from varying greatly or decreasing excessively. It is therefore possible to converge the rotational speed NE toward the idling speed NOBJ while operating the internal combustion engine 1 stably, and as a result the catalytic converter 3 can exhibit stable emission purifying performance.

Figure 13:
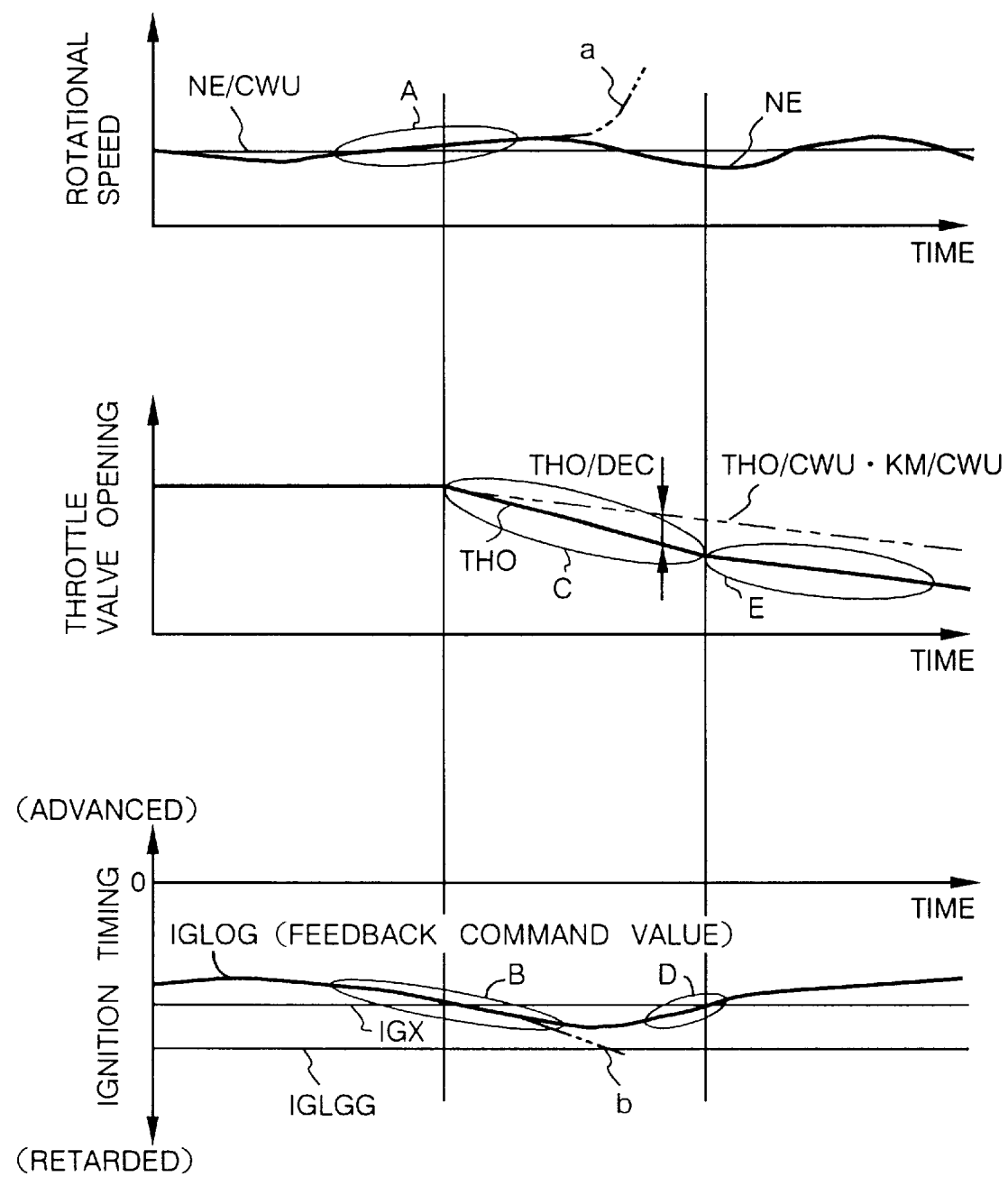
FIG. 13 is a diagram illustrative of the control process carried out by the control system shown in FIG. 1.

According to the illustrated embodiment, while the ignition timing is controlled according to the PI feedback control process for converging the rotational speed NE toward the target rotational speed NE/CWU, i.e., while the retarding correction indication flag F/NEFB is being set to "1", if the command value IGLOG for the ignition timing determined in STEP10-4 is more retarded than the threshold IGX, then the throttle valve opening THO is reduced from the basic throttle valve opening (=THO/CWU·KM/CWU) that is determined from the basic value THO/CWU and the basic value corrective coefficient KM/CWU, for reducing the increase in the quantity of intake air. This offers advantages which will be described below with reference to FIG. 13. It is assumed that the command value IGLOG for the ignition timing determined in STEP10-4 while the retarding correction indication flag F/NEFB is being set to "1" is referred to as a "feedback command value IGLOG". FIG. 13 shows the rotational speed NE (actual rotational speed) of the internal combustion engine 1, the throttle valve opening THO, and the feedback command value IGLOG for the ignition timing, as they change with time, respectively by solid-line curves in upper, middle, and lower sections thereof.

The manner in which the friction of various parts of the internal combustion engine 1 is lowered as the internal combustion engine 1 is warmed up is affected by not only the engine temperature TW, but also various other factors including the amount and temperature of lubricating oil. The friction may be reduced at a time earlier than the time (t2 in FIG. 9) when the throttle valve opening THO corresponding to the increase in the quantity of intake air starts being reduced according to the pattern in the time table shown in FIG. 9, or may be reduced at a rate greater than normal. If the throttle valve opening THO were controlled in such a case according to the basic throttle valve opening (=THO/CWU·KM/CWU) determined from the basic value THO/CWU and the basic value corrective coefficient KM/CWU, then the rotational speed NE would tend to become higher than the target rotational speed NE/CWU as indicated by an enclosed portion A in the upper section of FIG. 13, for example. Accordingly, the feedback command valve IGLOG for the ignition timing would approach the allowable retarded limit IGLGG as indicated by an enclosed portion B in the lower section of FIG. 13. If the rotational speed NE would continuously tend to become higher than the target rotational speed NE/CWU as indicated by the imaginary-line curve a in the upper section of FIG. 13, the ignition timing would finally be more retarded than the allowable retarded limit IGLGG as indicated by the imaginary-line curve b in the lower section of FIG. 13. If the feedback command value IGLOG for the ignition timing, i.e., the command value IGLOG for the ignition timing determined to converge the rotational speed NE toward the target rotational speed NE/CWU, were more retarded than the allowable retarded limit IGLGG, the ignition timing that would actually be supplied from the controller 2 to the ignition device 10 would be limited to the allowable retarded limit IGLGG, as described above. Under this condition, the tendency of the rotational speed NE to increase could not be avoided, allowing the rotational speed NE to become much higher than the target rotational speed NE/CWU as indicated by the imaginary-line curve a in the upper section of FIG. 13.

According to the embodiment of the present invention, if the feedback command value IGLOG becomes more retarded than the threshold IGX which is slightly more advanced than the allowable retarded limit IGLGG, then insofar as such a state continues, the throttle valve opening THO is reduced from the basic throttle valve opening (=THO/CWU·KM/CWU) determined from the basic value THO/CWU and the basic value corrective coefficient KM/CWU, by the unit corrective value d/THODEC in each control cycle (see an enclosed portion C in the middle section of FIG. 13). Stated otherwise, the basic increase in the quantity of intake air determined by the basic value THO/CWU and the basic value corrective coefficient KM/CWU is reduced by a value corresponding to the unit corrective value d/THODEC. Because the unit corrective value d/THODEC for the throttle valve opening is established depending on the engine temperature TW at the time the internal combustion engine 1 starts to operated, i.e., a warmed-up condition of the internal combustion engine 1, the increase in the quantity of intake air can be reduced in a manner commensurate with the reduction in the friction of various parts of the internal combustion engine 1.

As the increase in the quantity of intake air is reduced, the tendency of the rotational speed NE to increase is avoided. As a result, after the feedback command value IGLOG is changed so as to be more retarded than the threshold IGX, the feedback command value IGLOG is prevented from being further retarded, but basically begins to become advanced without being retarded up to the allowable retarded limit IGLGG, as indicated by an enclosed portion D in the lower section of FIG. 13. Since the throttle valve opening THO which determines the increase in the quantity of intake air progressively decreases by the unit corrective value d/THODEC from the basic throttle valve opening (=THO/CWU·KM/CWU) that is determined by the basic value THO/CWU and the basic value corrective coefficient KM/CWU, the increase in the quantity of intake air also progressively decreases. Therefore, the command value IGLOG for the ignition timing determined to converge the rotational speed NE toward the target rotational speed NE/CWU does not change abruptly.

The feedback command value IGLOG for the ignition timing determined to converge the rotational speed NE toward the target rotational speed NE/CWU thus basically remains more advanced than the allowable retarded limit IGLGG, and does not change abruptly. The ignition device 10 can be operated without fail according to the feedback command value IGLOG for stably converging the rotational speed NE toward the target rotational speed NE/CWU.

According to the illustrated embodiment, if the feedback command value IGLOG reaches the threshold IGX while it is returning from a more retarded value than the threshold IGX to a more advanced value than the threshold IGX, the throttle corrective quantity THO/DEC (which is a value produced by adding the unit corrective value d/THODEC in each control cycle from the time when the feedback command value IGLOG becomes more retarded than the threshold IGX to the time when the feedback command value IGLOG returns to the threshold IGX) is held to the present value (which is a value determined in the preceding control cycle). Therefore, after the feedback command value IGLOG reaches the threshold IGX while it is returning to a more advanced value than the threshold IGX, unless the feedback command value IGLOG becomes more retarded than the threshold IGX, the throttle corrective quantity THO/DEC with respect to the basic throttle valve opening (=THO/CWU·KM/CWU) does not increase further, but is held constant (see an enclosed portion E in the middle section of FIG. 13).

Consequently, the increase in the quantity of intake air is prevented from being unduly reduced to avoid an undue reduction in the amount of heat generated by the internal combustion engine 1 and hence avoid a delay in activating the catalytic converter 3.

Figure 14:
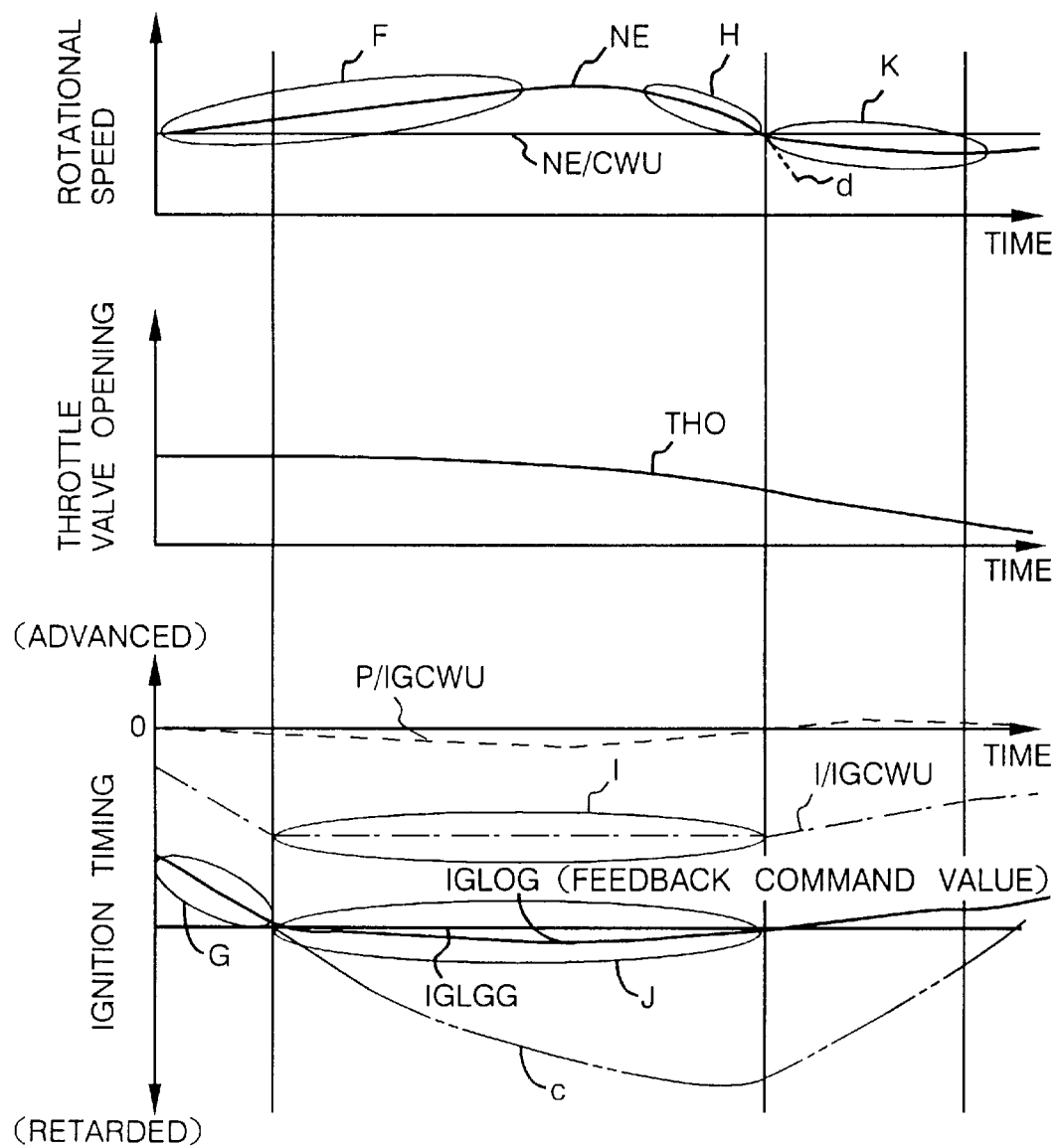
FIG. 14 is a diagram illustrative of the control process carried out by the control system shown in FIG. 1.

According to the illustrated embodiment, furthermore, if the feedback command value IGLOG exceeds the allowable retarded limit IGLGG and becomes more retarded than the allowable retarded limit IGLGG owing to an abrupt reduction in the load on the internal combustion engine 1, the value of the integral term I/IGCWU in the PI control process is maintained. This offers advantages which will be described below with reference to FIG. 14. FIG. 14 shows the rotational speed NE (actual rotational speed) of the internal combustion engine 1, the throttle valve opening THO, and the feedback command value IGLOG for the ignition timing, as they change with time, respectively by solid-line curves in upper, middle, and lower sections thereof.

When the automatic transmission coupled to the internal combustion engine 1 is shifted from the D range to the N range while the friction of the internal combustion engine 1 is being reduced relatively greatly, the load on the internal combustion engine 1 is greatly reduced, resulting in a strong tendency of the rotational speed NE to increase (see an enclosed portion F in the upper section of FIG. 14). The above-described process of reducing the increase in the quantity of intake air may fail to reduce such a tendency of the rotational speed NE to increase, but allow the feedback command value IGLOG to be abruptly retarded in excess of the allowable retarded limit IGLGG (see an enclosed portion G in the lower section of FIG. 14).

If the integral term I/IGCWU in the PI control process were continuously calculated and updated even after the feedback command value IGLOG is retarded in excess of the allowable retarded limit IGLGG, then since the integral term I/IGCWU represents integration of the difference (NE−NE/CWU) between the rotational speed NE and the present target rotational speed NE/CWU with respect to time, the value of the integral term I/IGCWU would increase. Therefore, even when the tendency of the rotational speed NE to increase is reduced and the rotational speed NE tends to decrease (see an encircled portion H in the upper section of FIG. 14) as the reduction of the throttle valve opening THO proceeds subsequently (see the middle section of FIG. 14), it would take a certain time for the feedback command value IGLOG to become more advanced than the allowable retarded limit IGLGG, as indicated by the imaginary-line curve c in the lower section of FIG. 14. As a consequence, the tendency of the rotational speed NE to decrease could not be reduced quickly, allowing the rotational speed NE to drop greatly from the target rotational speed NE/CWU, as indicated by the imaginary-line curve d in the upper section of FIG. 14.

According to the present embodiment, however, when the feedback command value IGLOG is retarded in excess of the allowable retarded limit IGLGG, the integral term I/IGCWU is held to the value at the time, as indicated by the dot-and-dash-line curve I in the middle section of FIG. 14. Therefore, the feedback command value IGLOG varies, as indicated by an enclosed portion J in the lower section of FIG. 14, according to the proportional term P/IGCWU (see the broken-line curve in the lower section of FIG. 14) that is proportional to the difference (NE−NE/CWU) between the rotational speed NE and the present target rotational speed NE/CWU. In the enclosed portion J, the actual ignition timing of the internal combustion engine 1 is limited to the allowable retarded limit IGLGG. Therefore, the feedback command value IGLOG will not be much retarded than the allowable retarded limit JGLGG. When the tendency of the rotational speed NE to increase is reduced and the rotational speed NE tends to decrease (see the encircled portion H in the upper section of FIG. 14) as the reduction of the throttle valve opening THO proceeds subsequently (see the middle section of FIG. 14), the feedback command value IGLOG quickly becomes more advanced than the allowable retarded limit IGLGG, as indicated by the enclosed portion K in the lower section of FIG. 14. As a result, the actual ignition timing of the internal combustion engine 1 is quickly controlled according to the feedback command value IGLOG which has become more advanced than the allowable retarded limit IGLGG. The tendency of the rotational speed NE to decrease is quickly eliminated, and the rotational speed NE is converted toward the target rotational speed NE/CWU, as indicated by an enclosed portion K in the upper section of FIG. 14.

As described above, the control system according to the present embodiment is capable of controlling the ignition timing according to the feedback control process for efficiently and stably converging the rotational speed NE of the internal combustion engine 1 toward the target rotational speed NE/CWU under various conditions.

Furthermore, when a load is to be actuated by the internal combustion engine 1, or the rotational speed NE and the engine temperature TW of the internal combustion engine 1 are too high or too low, or the period of time in which the internal combustion engine 1 operates exceeds the given predetermined limit time TCWULMT, due to running conditions of the motor vehicle and operation of the air conditioner, for example, the CWU mode is canceled, or the control system is not operated in the CWU mode. Therefore, it is possible to enable the internal combustion engine 1 to provide a desired level of performance to actuate the load, and also to avoid an excessive burden on the internal combustion engine 1.

When the CWU mode is canceled, the process of increasing the quantity of intake air drawn into the internal combustion engine 1 is immediately canceled, and the throttle valve opening is made depending on the movement of the accelerator pedal, with the ignition timing progressively becoming advanced toward its original setting. Therefore, the motor vehicle starts running, i.e., the load is actuated by the internal combustion engine 1, as the internal combustion engine 1 smoothly operates depending on the movement of the accelerator pedal.

The ignition timing is retarded in the CWU mode by increasing the quantity of intake air and then correcting the ignition timing to converge the rotational speed NE produced as a result of increasing the quantity of intake air toward the target rotational speed NE/CWU. As a result, the ignition timing is not affected by a delay in changing the quantity of intake air due to the control of the throttle valve opening, but is retarded according to the retarding corrective quantity IG/CPID matching the quantity of intake air.

Thus, the control process of increasing the quantity of intake air for quickly activating the catalytic converter 3 and the control process of retarding the ignition timing can be carried out independently of each other. Since the control process of retarding the ignition timing can be carried out according to the feedback control process focused only on the rotational speed NE of the internal combustion engine 1, the control system according to the present embodiment is relatively simple while providing necessary control capability.

In the illustrated embodiment, the target rotational speed NE/CWU (the target rotational speed from the time when the rotational speed NE has reached the preset rotational speed (NOBJ+NECPIS)) for retarding the ignition timing is changed linearly from the preset rotational speed (NOBJ+NECPIS) toward the idling speed NOBJ at a constant rate of descent. However, the target rotational speed NE/CWU may be changed from the preset rotational speed (NOBJ+NECPIS) to the idling speed NOBJ according to other patterns, e.g., according to a curved pattern.

In the illustrated embodiment, the retarding corrective quantity IG/CPID for the ignition timing to converge the rotational speed NE toward the target rotational speed NE/CWU is determined according to the PI control process. However, the retarding corrective quantity IG/CPID may be determined according to a PID control process which involves a derivative term as well as proportional and integral terms.

In the illustrated embodiment, the quantity of intake air drawn into the internal combustion engine is controlled by the throttle valve actuator 12. However, the throttle valve may be interlinked with an ordinary accelerator pedal, and the quantity of intake air may be controlled by controlling the rate of flow of intake air through the bypass passage that bypasses the throttle valve. In such a case, a flow control valve used for controlling the rate of flow of intake air through the bypass passage may have flow control characteristics capable of keeping the quantity of intake air required in the present embodiment. The opening of the flow control valve may be determined in the same manner as the throttle valve opening THO.

Figure 15:
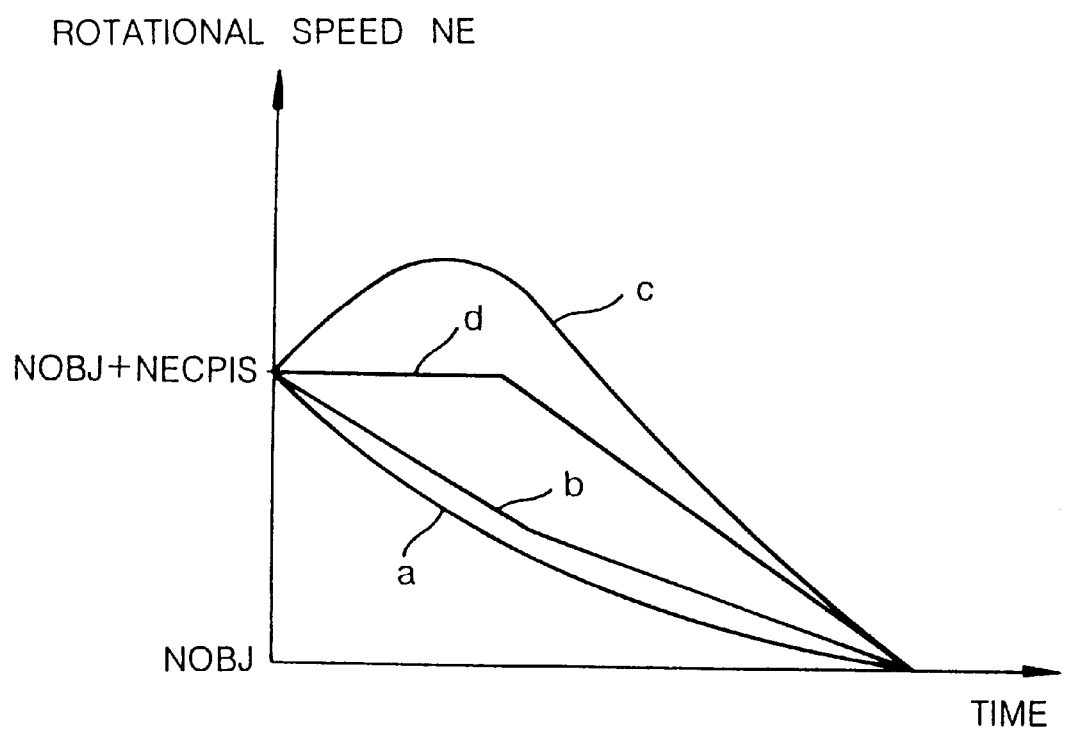
FIG. 15 is a diagram showing various patterns for setting up target rotational speeds for the internal combustion engine.

In the illustrated embodiment, the target rotational speed NE/CWU (the target rotational speed from the time when the rotational speed NE has reached the preset rotational speed (NOBJ+NECPIS)) for retarding the ignition timing is changed linearly from the preset rotational speed (NOBJ+NECPIS) toward the idling speed NOBJ at a constant rate of descent. However, the target rotational speed NE/CWU may be changed according to a curved pattern as indicated by the solid-line curve a in FIG. 15, or according to a pattern including a change in the rate of descent of the target rotational speed NE/CWU, as indicated by the solidline curve b in FIG. 15. Alternatively, the target rotational speed NE/CWU may be increased and then lowered toward the idling speed NOBJ, as indicated by the solid-line curve c in FIG. 15, or may be maintained at the preset rotational speed (NOBJ+NECPIS) for a given period of time and then lowered toward the idling speed NOBJ, as indicated by the solid-line curve d in FIG. 15.

Although a certain preferred embodiment of the present invention has been shown and described in detail, it should be understood that various changes and modifications may be made therein without departing from the scope of the appended claims.

What is claimed is:

1. A control system for controlling an internal combustion engine which discharges exhaust gases through an emission purifier, comprising:

intake air quantity control means for increasing the quantity of intake air drawn into the internal combustion engine while the internal combustion engine is idling for quickly activating the emission purifier after the internal combustion engine has started to operate, to a level which is greater by a predetermined increase than the quantity of intake air drawn into the internal combustion engine while the internal combustion engine is idling normally;

means for establishing the predetermined increase depending on the engine temperature of the internal combustion engine; and ignition timing control means for generating a command value for ignition timing of the internal combustion engine according to a feedback control process to converge the rotational speed of the internal combustion engine toward a predetermined target rotational speed which varies in accordance with predetermined after start engine conditions, and for controlling the ignition timing of the internal combustion engine based on the generated command value thereby to retard the ignition timing.

2. A control system according to claim 1, further comprising target rotational speed setting means for establishing said target rotational speed by changing the target rotational speed from a preset rotational speed toward a predetermined idling speed after the rotational speed of the internal combustion engine has reached said preset rotational speed which is higher than said idling speed after the quantity of intake air drawn into the internal combustion engine has started being increased by said intake air quantity control means.

3. A control system according to claim 1, wherein said intake air quantity control means comprises means for increasing said predetermined increase progressively with time immediately after the quantity of intake air drawn into the internal combustion engine has started being increased.

4. A control system according to claim 1, wherein said intake air quantity control means comprises means for reducing said predetermined increase progressively with time upon elapse of a predetermined time after the quantity of intake air drawn into the internal combustion engine has started being increased.

5. A control system according to claim 1, 2, 3 or 4, wherein said intake air quantity control means comprises means for correcting said predetermined increase so as to reduce the quantity of intake air when said command value for ignition timing generated by said ignition timing control means according to the feedback control process becomes more retarded than a predetermined threshold, which is established in a retarded range, within an allowable range of ignition timing in which said internal combustion engine can operate normally.

6. A control system according to claim 5, wherein said intake air quantity control means comprises means for progressively increasing a corrective quantity by which said predetermined increase is corrected so as to reduce the quantity of intake air, when said command value for ignition timing generated by said ignition timing control means according to the feedback control process is more retarded than said predetermined threshold.

7. A control system according to claim 6, wherein said intake air quantity control means comprises means for increasing said corrective quantity in each control cycle by a predetermined value established depending on a warmed-up state of the internal combustion engine, when said corrective quantity by which said predetermined increase is corrected so as to reduce the quantity of intake air is progressively increased.

8. A control system according to claim 6, wherein said intake air quantity control means comprises means for holding said corrective quantity by which said predetermined increase is corrected so as to reduce the quantity of intake air, to a present corrective quantity when said command value for ignition timing generated by said ignition timing control means according to the feedback control process is changed so as to be more advanced than said predetermined threshold, when said predetermined increase is corrected so as to reduce the quantity of intake air.

9. A control system according to claim 5, wherein said predetermined threshold is more advanced than a retarded limit of the allowable range of ignition timing.

10. A control system according to claim 5, wherein said ignition timing control means comprises means for generating the command value for ignition timing of the internal combustion engine according to a proportional plus integral control process as said feedback control process, and controlling the ignition timing of the internal combustion engine with a retarded limit of the allowable range of ignition timing and holding the value of an integral term of the proportional plus integral control process to a present value when the generated command value becomes more retarded than said retarded limit of the allowable range of ignition timing.

11. A control system according to claim 1, further comprising decision means for deciding whether or not the increasing of the quantity of intake air with said intake air quantity control means and the controlling of the ignition timing of the internal combustion engine with said ignition timing control means are to be canceled, based on an operating state of the internal combustion engine, wherein said intake air quantity control means and said ignition timing control means are disabled if the increasing of the quantity of intake air with said intake air quantity control means and the controlling of the ignition timing of the internal combustion engine with said ignition timing control means are to be canceled as decided by said decision means.

12. A control system according to claim 11, wherein said decision means comprises means for deciding that the increasing of the quantity of intake air with said intake air quantity control means and the controlling of the ignition timing of the internal combustion engine with said ignition timing control means are to be canceled, if at least one of a load, a rotational speed, and an engine temperature of said internal combustion engine, as said operating state, satisfies a predetermined condition.

13. A control system according to claim 1, further comprising decision means for deciding whether or not the increasing of the quantity of intake air with said intake air quantity control means and the controlling of the ignition timing of the internal combustion engine with said ignition timing control means are to be canceled, based on an elapsed time in which the quantity of intake air is increased by said intake air quantity control means, wherein said intake air quantity control means and said ignition timing control means are disabled if the increasing of the quantity of intake air with said intake air quantity control means and the controlling of the ignition timing of the internal combustion engine with said ignition timing control means are to be canceled as decided by said decision means.

14. A control system according to claim 13, wherein said decision means comprises means for deciding that the increasing of the quantity of intake air with said intake air quantity control means and the controlling of the ignition timing of the internal combustion engine with said ignition timing control means are to be canceled, if said elapsed time exceeds a predetermined time.

15. A control system according to claim 11 or 13, wherein said intake air quantity control means comprises means for immediately stopping increasing the quantity of intake air when the increasing of the quantity of intake air is to be canceled as decided by said decision means, and said ignition timing control means comprises means for progressively advancing the ignition timing which has been retarded according to the feedback control process when the controlling of the ignition timing is to be canceled as decided by said decision means.

16. A control system for controlling an internal combustion engine which discharges exhaust gases through an emission purifier, comprising:

intake air quantity control means for increasing the quantity of intake air drawn into the internal combustion engine while the internal combustion engine is idling for quickly activating the emission purifier after the internal combustion engine has started to operate, to a level which is greater by a predetermined increase than the quantity of intake air drawn into the internal combustion engine while the internal combustion engine is idling normally;

means for establishing the predetermined increase depending on the engine temperature of the internal combustion engine; and ignition timing control means for generating a command value for ignition timing of the internal combustion engine according to a feedback control process to converge the rotational speed of the internal combustion engine toward a predetermined target rotational speed, and for controlling the ignition timing of the internal combustion engine based on the generated command value thereby to retard the ignition timing, wherein said intake air quantity control means comprises means for correcting said predetermined increase so as to reduce the quantity of intake air when said command value for ignition timing generated by said ignition timing generated by said ignition timing control means according to the feedback control process becomes more retarded than a predetermined threshold, which is established in a retarded range, within an allowable range of ignition timing in which said internal combustion engine can operate normally, wherein said intake air quantity control means comprises means for progressively increasing a corrective quantity by which said predetermined increase is corrected so as to reduce the quantity of intake air, when said command value for ignition timing generated by said ignition timing control means according to the feedback control process is more retarded than said predetermined threshold, and wherein said intake air quantity control means comprises means for holding said corrective quantity by which said predetermined increase is corrected so as to reduce the quantity of intake air, to a present corrective quantity when said command value for ignition timing generated by said ignition timing control means according to the feedback control process is changed so as to be more advanced than said predetermined threshold, when said predetermined increase is corrected so as to reduce the quantity of intake air.

17. A control system for controlling an internal combustion engine which discharges exhaust gases through an emission purifier, comprising:

intake air quantity control means for increasing the quantity of intake air drawn into the internal combustion engine while the internal combustion engine is idling for quickly activating the emission purifier after the internal combustion engine has started to operate, to a level which is greater by a predetermined increase than the quantity of intake air drawn into the internal combustion engine while the internal combustion engine is idling normally;

means for establishing the predetermined increase depending on the engine temperature of the internal combustion engine; and ignition timing control means for generating a command value for ignition timing of the internal combustion engine according to a feedback control process to converge the rotational speed of the internal combustion engine toward a predetermined target rotational speed, and for controlling the ignition timing of the internal combustion engine based on the generated command value thereby to retard the ignition timing, wherein said intake air quantity control means comprises means for correcting said predetermined increase so as to reduce the quantity of intake air when said command value for ignition timing generated by said ignition timing control means according to the feedback control process becomes more retarded than a predetermined threshold, which is established in a retarded range, within an allowable range of ignition timing in which said internal combustion engine can operate normally, and wherein said ignition timing control means comprises means for generating the command value for ignition timing of the internal combustion engine according to a proportional plus integral control process as said feedback control process, and controlling the ignition timing of the internal combustion engine with a retarded limit of the allowable range of ignition timing and holding the value of an integral term of the proportional plus integral control process to a present value when the generated command value becomes more retarded than said retarded limit of the allowable range of ignition timing.

18. A control system for controlling an internal combustion engine which discharges exhaust gases through an emission purifier, comprising:

intake air quantity control means for increasing the quantity of intake air drawn into the internal combustion engine while the internal combustion engine is idling for quickly activating the emission purifier after the internal combustion engine has started to operate, to a level which is greater by a predetermined increase than the quantity of intake air drawn into the internal combustion engine while the internal combustion engine is idling normally;

means for establishing the predetermined increase depending on the engine temperature of the internal combustion engine;

ignition timing control means for generating a command value for ignition timing of the internal combustion engine according to a feedback control process to converge the rotational speed of the internal combustion engine toward a predetermined target rotational speed, and for controlling the ignition timing of the internal combustion engine based on the generated command value thereby to retard the ignition timing, and decision means for deciding whether or not the increasing of the quantity of intake air with said intake air quantity control means and the controlling of the ignition timing of the internal combustion engine with said ignition timing control means are to be canceled, based on an operating state of the internal combustion engine, wherein said intake air quantity control means and said ignition timing control means are disabled if the increasing of the quantity of intake air with said intake air quantity control means and the controlling of the ignition timing of the internal combustion engine with said ignition timing control means are to be canceled as decided by said decision means, and wherein said intake air quantity control means comprises means for immediately stopping increasing the quantity of intake air when the increasing of the quantity of intake air is to be canceled as decided by said decision means, and said ignition timing control means comprises means for progressively advancing the ignition timing which has been retarded according to the feedback control process when the controlling of the ignition timing is to be canceled as decided by said decision means.

19. A control system for controlling an internal combustion engine which discharges exhaust gases through an emission purifier, comprising:

intake air quantity control means for increasing the quantity of intake air drawn into the internal combustion engine while the internal combustion engine is idling for quickly activating the emission purifier after the internal combustion engine has started to operate, to a level which is greater by a predetermined increase than the quantity of intake air drawn into the internal combustion engine while the internal combustion engine is idling normally;

means for establishing the predetermined increase depending on the engine temperature of the internal combustion engine;

ignition timing control means for generating a command value for ignition timing of the internal combustion engine according to a feedback control process to converge the rotational speed of the internal combustion engine toward a predetermined target rotational speed, and for controlling the ignition timing of the internal combustion engine based on the generated command value thereby to retard the ignition timing, and decision means for deciding whether or not the increasing of the quantity of intake air with said intake air quantity control means and the controlling of the ignition timing of the internal combustion engine with said ignition timing control means are to be canceled, based on an elapsed time in which the quantity of intake air increased by said intake air quantity control means, wherein said intake air quantity control means and said ignition timing control means are disabled if the increasing of the quantity of intake air with said intake air quantity control means and the controlling of the ignition timing of the internal combustion engine with said ignition timing control means are to be canceled as decided by said decision means, wherein said intake air quantity control means comprises means for immediately stopping increasing the quantity of intake air when the increasing of the quantity of intake air is to be canceled as decided by said decision means, and said ignition timing control means comprises means for progressively advancing the ignition timing which has been retarded according to the feedback control process when the controlling of the ignition timing is to be canceled as decided by said decision means.

* * * * *